United States Patent
Ji et al.

(10) Patent No.: US 11,526,889 B2
(45) Date of Patent: Dec. 13, 2022

(54) RESOURCE TRANSFERRING MONITORING METHOD AND DEVICE

(71) Applicant: ADVANCED NEW TECHNOLOGIES CO., LTD., Grand Cayman (KY)

(72) Inventors: Xiaoxi Ji, Hangzhou (CN); Licui Gao, Hangzhou (CN); Lujia Chen, Hangzhou (CN); Weiqiang Wang, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 16/911,089

(22) Filed: Jun. 24, 2020

(65) Prior Publication Data

US 2020/0327551 A1    Oct. 15, 2020

Related U.S. Application Data

(63) Continuation of application No. PCT/CN2019/073130, filed on Jan. 25, 2019.

(30) Foreign Application Priority Data

Feb. 12, 2018 (CN) .......................... 201810144895.4

(51) Int. Cl.
*G06Q 20/40* (2012.01)
*G06Q 20/38* (2012.01)
(Continued)

(52) U.S. Cl.
CPC ........... *G06Q 20/4016* (2013.01); *G06N 3/02* (2013.01); *G06N 20/20* (2019.01); *G06Q 20/382* (2013.01); *G06N 3/04* (2013.01); *G06N 3/08* (2013.01)

(58) Field of Classification Search
CPC ... G06Q 20/40–40185; G06Q 20/4016; G06Q 20/382; G06Q 20/38–425;
(Continued)

(56) References Cited

U.S. PATENT DOCUMENTS

| 7,346,575 B1 | 3/2008 | Ahles et al. |
| 7,537,153 B2 | 5/2009 | Hurwitz et al. |

(Continued)

FOREIGN PATENT DOCUMENTS

| CA | 2455556 C | 1/2008 |
| CN | 101490704 A | 7/2009 |

(Continued)

OTHER PUBLICATIONS

Ogwueleka. Journal of Engineering Science and Technology. vol. 6, No. 3 (2011) 311-322. (available via http://citeseerx.ist.psu.edu/viewdoc/summary?doi=10.1.1.697.8197). (Year: 2011).*

(Continued)

*Primary Examiner* — Neha Patel
*Assistant Examiner* — Jeffrey L Licitra

(57) ABSTRACT

Methods and apparatus, including computer programs encoded on computer storage media, for monitoring resource transfer are provided. One of the methods includes: by a server, receiving a resource deposit request from a resource deposit initiator; performing, using a first risk identification model, a first risk identification on the target account according to the resource deposit request to obtain a first risk identification result; receiving a resource withdrawal request from a resource withdrawal initiator, and the resource withdrawal request requesting a resource withdrawal from the target account to the recipient account; performing, using a second risk identification model, a second risk identification on the target account according to the resource withdrawal request to obtain a second risk (Continued)

identification result; and determining, using a third risk identification model, a resource transfer risk monitoring result of the target account according to the first risk identification result and the second risk identification result.

20 Claims, 13 Drawing Sheets

(51) Int. Cl.
  *G06N 3/02* (2006.01)
  *G06N 20/20* (2019.01)
  *G06N 3/04* (2006.01)
  *G06N 3/08* (2006.01)
(58) Field of Classification Search
  CPC .......... G06N 3/04–049; G06N 3/0472; G06N 3/049; G06N 3/02; G06F 17/18
  See application file for complete search history.

(56) References Cited

U.S. PATENT DOCUMENTS

| | | | |
|---|---|---|---|
| 7,861,924 B1 | 1/2011 | Block et al. | |
| 7,941,370 B2 | 5/2011 | Paulsen et al. | |
| 7,958,027 B2 | 6/2011 | Lawrence | |
| 8,204,826 B2 | 6/2012 | Banaugh et al. | |
| 8,473,415 B2 | 6/2013 | Siegel et al. | |
| 8,510,199 B1 | 8/2013 | Erlanger | |
| 8,600,872 B1 | 12/2013 | Yan | |
| 2003/0177087 A1 | 9/2003 | Lawrence | |
| 2003/0233319 A1 | 12/2003 | Lawrence | |
| 2005/0080717 A1 | 4/2005 | Belyi et al. | |
| 2006/0146839 A1 | 7/2006 | Hurwitz et al. | |
| 2008/0109392 A1* | 5/2008 | Nandy | G06N 5/027 706/47 |
| 2009/0106151 A1 | 4/2009 | Nelsen et al. | |
| 2010/0305993 A1* | 12/2010 | Fisher | G06Q 10/0635 705/7.28 |
| 2011/0016052 A1 | 1/2011 | Scragg | |
| 2014/0180974 A1 | 6/2014 | Kennel et al. | |
| 2015/0039512 A1* | 2/2015 | Adjaoute | G06Q 20/325 705/44 |
| 2015/0227936 A1* | 8/2015 | Bruesewitz | G06Q 20/4016 705/44 |
| 2016/0321661 A1* | 11/2016 | Hammond | G06Q 20/407 |
| 2017/0193514 A1 | 7/2017 | Chen | |
| 2017/0262852 A1* | 9/2017 | Florimond | G06Q 20/405 |
| 2017/0286962 A1* | 10/2017 | Lai | G06Q 20/24 |
| 2017/0372318 A1* | 12/2017 | Shami | H04L 63/1408 |
| 2018/0027413 A1* | 1/2018 | Hanley | G07C 9/37 726/7 |
| 2018/0032870 A1 | 2/2018 | Liu et al. | |
| 2018/0082304 A1* | 3/2018 | Summerlin | G06N 3/08 |
| 2018/0114216 A1* | 4/2018 | Joseph | G06Q 20/36 |
| 2018/0374089 A1* | 12/2018 | Duboue | G06N 3/088 |
| 2019/0034931 A1* | 1/2019 | Cash | G06Q 20/389 |
| 2019/0066110 A1* | 2/2019 | Shen | G06Q 30/0201 |
| 2019/0095996 A1 | 3/2019 | Song et al. | |

FOREIGN PATENT DOCUMENTS

| | | |
|---|---|---|
| CN | 101714273 A | 5/2010 |
| CN | 101976419 A | 2/2011 |
| CN | 103049851 A | 4/2013 |
| CN | 203192024 U | 9/2013 |
| CN | 103714479 A | 4/2014 |
| CN | 104813355 A | 7/2015 |
| CN | 104881783 A | 9/2015 |
| CN | 105389728 A | 3/2016 |
| CN | 105590207 A | 5/2016 |
| CN | 105631747 A | 6/2016 |
| CN | 106611375 A | 5/2017 |
| CN | 107103548 A | 8/2017 |
| CN | 108492104 A | 9/2018 |
| KR | 101775400 B1 | 9/2017 |
| TW | 201723968 A | 7/2017 |

OTHER PUBLICATIONS

Richard J. Bolton. David J. Hand. "Statistical Fraud Detection: A Review." Statist. Sci. 17 (3) 235-255, Aug. 2002. https://doi.org/10.1214/ss/1042727940 (Year: 2002).*
PCT International Search Report and the Written Opinion dated Apr. 24, 2019, issued in related International Application No. PCT/CN2019/073130, with partial English translation (10 pages).
Search Report dated Dec. 10, 2019, issued in related Taiwan Application No. 107146357 (1 page).
First Search dated Feb. 26, 2020, issued in related Chinese Application No. 201810144895.4 (1 page).
First Office Action dated Mar. 3, 2020, issued in related Chinese Application No. 201810144895.4, with English machine translation (26 pages).
Second Office Action dated May 6, 2020, issued in related Chinese Application No. 201810144895.4, with English machine translation (29 pages).
Supplementary Search dated Jun. 29, 2020, issued in related Chinese Application No. 201810144895.4 (2 pages).
Third Office Action dated Jul. 6, 2020, issued in related Chinese Application No. 201810144895.4, with English machine translation (23 pages).
International Preliminary Report on Patentability Chapter I for PCT Application No. PCT/CN2019/073130 dated Aug. 27, 2020.
Written Opinion and Search Report for Singaporean Application No. 11202006760T dated Feb. 28, 2022.

* cited by examiner

RESOURCE TRANSFERRING MONITORING METHOD AND DEVICE

CROSS-REFERENCE TO RELATED APPLICATIONS

This application is a continuation application of International Patent Application No. PCT/CN2019/073130, filed with the China National Intellectual Property Administration (CNIPA) on Jan. 25, 2019, which is based on and claims priority to and benefit of Chinese Patent Application No. 201810144895.4, filed with the CNIPA on Feb. 12, 2018, and entitled "RESOURCE TRANSFERRING MONITORING METHOD AND DEVICE." The entire contents of all of the above-identified applications are incorporated herein by reference.

TECHNICAL FIELD

The specification relates to the field of computer technologies, and in particular, to a resource transfer monitoring method, device, and a computer readable storage medium.

BACKGROUND

At present, the rapid development of mobile payment technologies has brought great convenience to people's daily lives, but also creates the possibility of cyber fraud for cybercriminals. Internet fraud activities increase, and fraud crimes emerge endlessly. According to statistics, thousands of fraudsters are disposing resources each day, and each fraudster involves about dozens of victims. For example, cases such as the Xu Yuyu's telecommunications fraud have also aroused public concern and reflection.

Currently, a main management and control manner for Internet fraud and disposal activities is as follows. Verification and management and control are performed on victims' reports and complaints, but usually fraudsters quickly transfer resources and complete disposal in a short time. Therefore, in a process of receiving a complaint from a victim and determining a fraud activity, a fraudster has disposed and transferred resources to an account. In this case, timeliness of performing management and control is poor, fraud and disposal activities of the fraudster cannot be promptly prevented and controlled, and consequently resource transfer by the fraudster cannot be promptly prevented.

It can be learned that in the existing technologies, post-event management and control is performed only on a complained fraud activity, there is no real-time monitoring for resource transfer, and timeliness of performing management and control on fraud and resource disposal activities is poor.

SUMMARY

Embodiments of the specification provide a resource transfer monitoring method, device, and a computer readable storage medium, so that real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in (deposit) risk identification result and a transfer-out (disposal) risk identification result, thereby improving accuracy of determination of fraud and disposal activities.

To resolve the foregoing technical problems, the embodiments of the specification are implemented as follows.

An embodiment of the specification provides a resource transfer monitoring method, including: performing a first risk identification on a target account according to a resource transfer-in request to obtain a first risk identification result; performing a second risk identification on the target account according to a resource transfer-out request to obtain a second risk identification result; and determining a resource transfer risk monitoring result of the target account according to the first risk identification result and the second risk identification result.

An embodiment of the specification provides a resource transfer monitoring method, including: performing a first risk identification on a target account according to a resource transfer-in request by using a first risk identification model to obtain a first risk identification result; performing a second risk identification on the target account according to a resource transfer-out request by using a second risk identification model to obtain a second risk identification result; and determining a resource transfer risk monitoring result of the target account according to the first risk identification result and the second risk identification result by using a third risk identification model.

An embodiment of the specification provides a resource transfer monitoring device, including: a first risk identification module configured to perform a first risk identification on a target account according to a resource transfer-in request to obtain a first risk identification result; a second risk identification module configured to perform a second risk identification on the target account according to a resource transfer-out request to obtain a second risk identification result; and a monitoring result determining module configured to determine a resource transfer risk monitoring result of the target account according to the first risk identification result and the second risk identification result.

An embodiment of the specification provides a resource transfer monitoring device, including: a first risk identification module configured to perform a first risk identification on a target account according to a resource transfer-in request by using a first risk identification model to obtain a first risk identification result; a second risk identification module configured to perform a second risk identification on the target account according to a resource transfer-out request by using a second risk identification model to obtain a second risk identification result; and a monitoring result determining module configured to determine a resource transfer risk monitoring result of the target account according to the first risk identification result and the second risk identification result by using a third risk identification model.

An embodiment of the specification provides a resource transfer monitoring apparatus, including: a processor; and a memory arranged to store a computer-executable instruction. The executable instruction, when executed, causes the processor to: perform a first risk identification on a target account according to a resource transfer-in request to obtain a first risk identification result; perform a second risk identification on the target account according to a resource transfer-out request to obtain a second risk identification result; and determine a resource transfer risk monitoring result of the target account according to the first risk identification result and the second risk identification result.

An embodiment of the specification provides a resource transfer monitoring apparatus, including: a processor; and a memory arranged to store a computer-executable instruction. The executable instruction, when executed, causes the processor to: perform a first risk identification on a target account according to a resource transfer-in request by using a first risk identification model to obtain a first risk identification result; perform a second risk identification on the target account according to a resource transfer-out request by using a second risk identification model to obtain a second risk identification result; and determine a resource transfer risk monitoring result of the target account according to the first risk identification result and the second risk identification result by using a third risk identification model.

An embodiment of the specification provides a storage medium for storing a computer-executable instruction, wherein when the executable instruction is executed, the following procedures are implemented: performing a first risk identification on a target account according to a resource transfer-in request to obtain a first risk identification result; performing a second risk identification on the target account according to a resource transfer-out request to obtain a second risk identification result; and determining a resource transfer risk monitoring result of the target account according to the first risk identification result and the second risk identification result.

An embodiment of the specification provides a storage medium for storing a computer-executable instruction, wherein when the executable instruction is executed, the following procedures are implemented: performing a first risk identification on a target account according to a resource transfer-in request by using a first risk identification model to obtain a first risk identification result; performing a second risk identification on the target account according to a resource transfer-out request by using a second risk identification model to obtain a second risk identification result; and determining a resource transfer risk monitoring result of the target account according to the first risk identification result and the second risk identification result by using a third risk identification model.

In a first aspect, a method for monitoring resource transfer is provided. The method includes: by a processor, receiving a resource deposit request from a resource deposit initiator, and the resource deposit request comprising an identifier of the resource deposit initiator and an identifier of a target account in which a resource is deposited; performing, using a first risk identification model, a first risk identification on the target account according to the resource deposit request to obtain a first risk identification result; receiving a resource withdrawal request from a resource withdrawal initiator, the resource withdrawal request comprising an identifier of the resource withdrawal initiator and an identifier of a recipient account, and the resource withdrawal request requesting a resource withdrawal from the target account to the recipient account; performing, using a second risk identification model, a second risk identification on the target account according to the resource withdrawal request to obtain a second risk identification result; and determining, using a third risk identification model, a resource transfer risk monitoring result of the target account according to the first risk identification result and the second risk identification result.

In an embodiment, the performing a first risk identification on the target account according to the resource deposit request to obtain a first risk identification result comprises: acquiring first association information related to the resource deposit request, wherein the first association information comprises at least one of initiating account information, target account information, and first resource transfer information; and performing the first risk identification on the target account according to the first association information using the first risk identification model to obtain the first risk identification result.

In an embodiment, the method further comprises: by the processor, determining, according to the first risk identification result, whether the resource deposit request is a risky deposit request; and in response to determining that the resource deposit request is a risky deposit request, determining, a deposit management and control mode corresponding to at least a threshold of the first risk identification result; and triggering and executing the deposit management and control mode for not fulfilling the resource deposit request.

In an embodiment, the performing a second risk identification on the target account according to the resource withdrawal request to obtain a second risk identification result comprises: acquiring second association information related to the resource withdrawal request, wherein the second association information comprises at least one of target account information, second resource transfer information, or recipient account information; and performing the second risk identification on the target account according to the second association information using the second risk identification model to obtain the second risk identification result.

In an embodiment, the determining a resource transfer risk monitoring result of the target account according to the first risk identification result and the second risk identification result comprises: determining a deposit risk identification result according to a plurality of previously obtained first risk identification results of the target account; determining at least one resource transfer risk identification strategy at least according to the deposit risk identification result and the second risk identification result using the third risk identification model; and determining that the target account is a risky account if the at least one resource transfer risk identification strategy meets a condition.

In an embodiment, the method further comprises: in response to determining that the target account is a risky account, by the processor, determining a disposal management and control mode of the target account according to the resource transfer risk identification strategy that meets the condition; and triggering and executing the disposal management and control mode to manage and control the target account.

In an embodiment, the first risk identification model includes a neural network model, the second risk identification model includes a gradient boosting regression model, or the third risk identification model includes a classification and regression tree model.

In a second aspect, an apparatus for monitoring resource transfer is provided. The apparatus includes a processor and a non-transitory computer-readable storage medium storing instructions executable by the processor to cause the system to perform operations. The operations comprise: by a processor, receiving a resource deposit request from a resource deposit initiator, and the resource deposit request comprising an identifier of the resource deposit initiator and an identifier of a target account in which a resource is deposited; performing, using a first risk identification model, a first risk identification on the target account according to the resource deposit request to obtain a first risk identification result; receiving a resource withdrawal request from a resource withdrawal initiator, the resource withdrawal request comprising an identifier of the resource withdrawal initiator and an identifier of a recipient account, and the resource withdrawal request requesting a resource withdrawal from the target account to the recipient account; performing, using a second risk identification model, a second risk identification on the target account according to the resource withdrawal request to obtain a second risk identification result; and determining, using a third risk identification model, a resource transfer risk monitoring result of the target account according to the first risk identification result and the second risk identification result.

In a third aspect, a non-transitory computer-readable storage medium for monitoring resource transfer is provided. The storage medium configured with instructions executable by one or more processors to cause the one or more processors to perform operations. The operations comprise: by a processor, receiving a resource deposit request from a resource deposit initiator, and the resource deposit request comprising an identifier of the resource deposit initiator and an identifier of a target account in which a resource is deposited; performing, using a first risk identification model, a first risk identification on the target account according to the resource deposit request to obtain a first risk identification result; receiving a resource withdrawal request from a resource withdrawal initiator, the resource withdrawal request comprising an identifier of the resource withdrawal initiator and an identifier of a recipient account, and the resource withdrawal request requesting a resource withdrawal from the target account to the recipient account; performing, using a second risk identification model, a second risk identification on the target account according to the resource withdrawal request to obtain a second risk identification result; and determining, using a third risk identification model, a resource transfer risk monitoring result of the target account according to the first risk identification result and the second risk identification result.

According to the resource transfer monitoring method and device in the embodiments of the specification, the first risk identification is performed on the target account according to the resource transfer-in (deposit) request to obtain the first risk identification result; the second risk identification is performed on the target account according to the resource transfer-out (disposal) request to obtain the second risk identification result; and the resource transfer risk monitoring result of the target account is determined according to the first risk identification result and the second risk identification result. According to the embodiments of the specification, real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in risk identification result and a transfer-out risk identification result, thereby improving accuracy of determination of fraud and disposal activities.

BRIEF DESCRIPTION OF THE DRAWINGS

To describe the technical solutions in the embodiments of the specification or in the existing technologies more clearly, the following briefly introduces the accompanying drawings for describing the embodiments or the existing technologies. The accompanying drawings in the following description show merely some embodiments of the specification, and a person of ordinary skill in the art may still derive other drawings from the accompanying drawings without creative efforts.

DETAILED DESCRIPTION OF THE EMBODIMENTS

To enable a person skilled in the art to better understand the technical solutions of the specification, the technical solutions of the embodiments of the specification will be described clearly and thoroughly below with reference to the accompanying drawings of the embodiments of the specification. The described embodiments are merely some rather than all of the embodiments of the specification. All other embodiments obtained by a person of ordinary skill in the art based on the embodiments of the specification without creative efforts shall fall within the protection scope of the specification.

Embodiments of the specification provide a resource transfer monitoring method and device, so that real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in (deposit) risk identification result and a transfer-out (disposal) risk identification result, thereby improving accuracy of determination of fraud and disposal activities.

Figure 1:
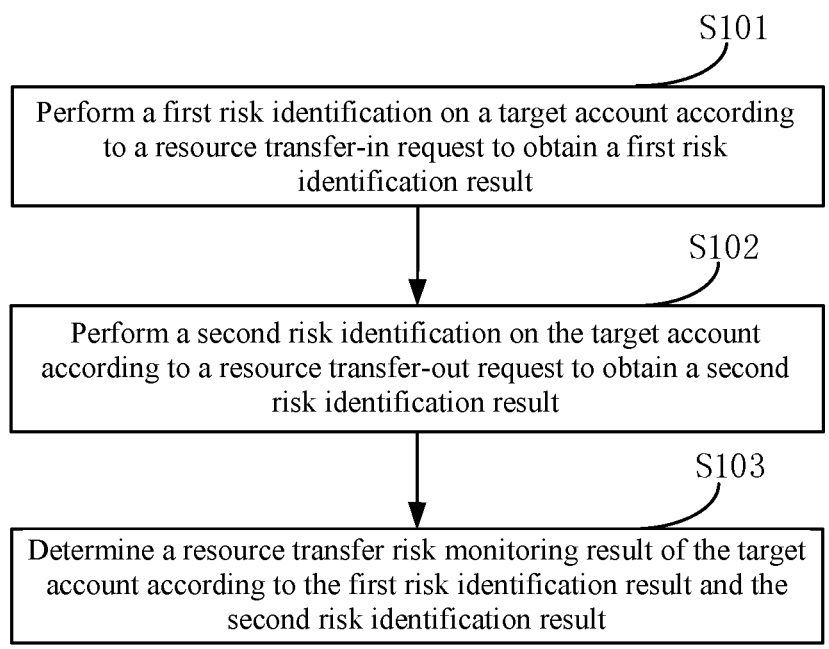
FIG. 1 is a first schematic flowchart of a resource transfer monitoring method, according to an embodiment of the specification.

FIG. 1 is a first schematic flowchart of a resource transfer monitoring method, according to an embodiment of the specification. The method in FIG. 1 may be executed by a server or a terminal device. The server may be an independent server or a server cluster including a plurality of servers. As shown in FIG. 1, the method includes at least the following steps.

S101, perform a first risk identification on a target account according to a resource transfer-in (deposit) request to obtain a first risk identification result.

The resource transfer-in request comprises an identifier of a resource transfer-in (deposit) initiator and an identifier of a resource transfer-in (deposit) recipient (namely, an identifier of the target account). In particular, for example, the resource transfer-in initiator makes a remittance to the target account. When a remittance transfer-in request is received, a fraud risk identification is first performed on a current remittance transaction to obtain a fraud risk identification result, that is, it is determined whether there is a fraud risk in the current remittance transaction. Then, it is determined whether the current remittance transaction is a fraudulent remittance to the target account that is provided by a victim for a fraudster when the victim is deceived, or is a normal remittance to a legitimate account provided for the resource transfer-in recipient when the resource transfer-in initiator is informed.

S102, perform a second risk identification on the target account according to a resource transfer-out request to obtain a second risk identification result.

For a cash withdrawal transaction, the resource transfer-out request comprises an identifier of a resource transfer-out initiator (namely, an identifier of the target account). For a transfer transaction, the resource transfer-out request comprises an identifier of a resource transfer-out initiator (namely, an identifier of the target account) and an identifier of a resource transfer-out recipient. In particular, for example, a remittance is made from the target account to the resource transfer-out recipient. When a transfer request is received, a disposal risk identification is first performed on a current transfer transaction to obtain a disposal risk identification result, that is, a disposal risk degree in the current transfer transaction is determined.

S103, determine a resource transfer risk monitoring result of the target account according to the first risk identification result and the second risk identification result.

In particular, for a specified target account, when a plurality of resource transfer-in initiators transfer resources to the target account, each resource transfer-in request corresponds to one first risk identification result. After the plurality of resource transfer-in initiators transfer the resources to the target account, when the target account initiates a resource transfer-out request, the second risk identification result is obtained based on the resource transfer-out request. Then, fraud or disposal risk is comprehensively determined based on a plurality of previously obtained first risk identification results and the second risk identification result. Finally, it is determined whether the resource transfer-out request has a resource transfer risk, to further determine whether the current resource transfer-out is an illegal disposal of an illegal income from the target account by a fraudster or a normal withdrawal of a legitimate income from the target account by a user.

According to this embodiment of the specification, the first risk identification is performed on the target account according to the resource transfer-in request to obtain the first risk identification result, the second risk identification is performed on the target account according to the resource transfer-out request to obtain the second risk identification result, and the resource transfer risk monitoring result of the target account is determined according to the first risk identification result and the second risk identification result. In this way, real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in risk identification result and a transfer-out risk identification result, thereby improving accuracy of determination of fraud and disposal activities.

The performing a first risk identification on a target account according to a resource transfer-in request to obtain a first risk identification result in S101 specifically includes acquiring first association information related to the resource transfer-in request, wherein the first association information includes at least one of initiating account information, target account information, and first resource transfer information.

Specifically, the first association information includes characteristics in multiple dimensions related to the resource transfer-in request. The initiating account information may include basic account attributes such as a user name, an opening bank, an account opening date, and a historical transaction record of an initiating account. The target account information may include account information such as basic account attributes, terminal activities, a terminal environment, and an account evaluation. The basic account attributes include a user name, an opening bank, an account opening date, a historical transaction record, maturity, a current asset, authentication information, subscription information, a contact list, and a friend status of a target account, and the like. The terminal activities include a mobile terminal operation record, a browsing record, and a social record. The terminal environment includes an account login device and an account login city (i.e., the city where the user logs in). The account evaluation includes an account credit, an account penalty, and an account reporting status. The first resource transfer information may include a payment status of the initiating account, a receipt status of the target account, and an interpersonal relationship between an initiator and a recipient. The payment status includes a transaction amount, transactions per capita, an amount variance, and a transaction success rate. The receipt status includes account concentration and diversification, a quantity of account cities (i.e., the cities that the resources are transferred from), and an accumulated received amount of the account. The interpersonal relationship between the initiator and the recipient includes a friend relationship, a relative relationship, a classmate relationship, a subordinate relationship, a stranger relationship between the initiator and the recipient, or the like.

The first risk identification is performed on the target account according to the acquired first association information by using a first risk identification model to obtain the first risk identification result, and the first risk identification model includes a neural network model.

In particular, the neural network model is obtained through training in the following manner: acquiring a plurality of transfer-in risk training samples, wherein the transfer-in risk training samples include positive samples representing normal transfer-in transactions and negative samples representing a fraud activities; and updating relevant model parameters in the neural network model through training based on the transfer-in risk training samples, wherein the neural network model describes a risk characteristic of a gain of the recipient's receipt.

Figure 2:
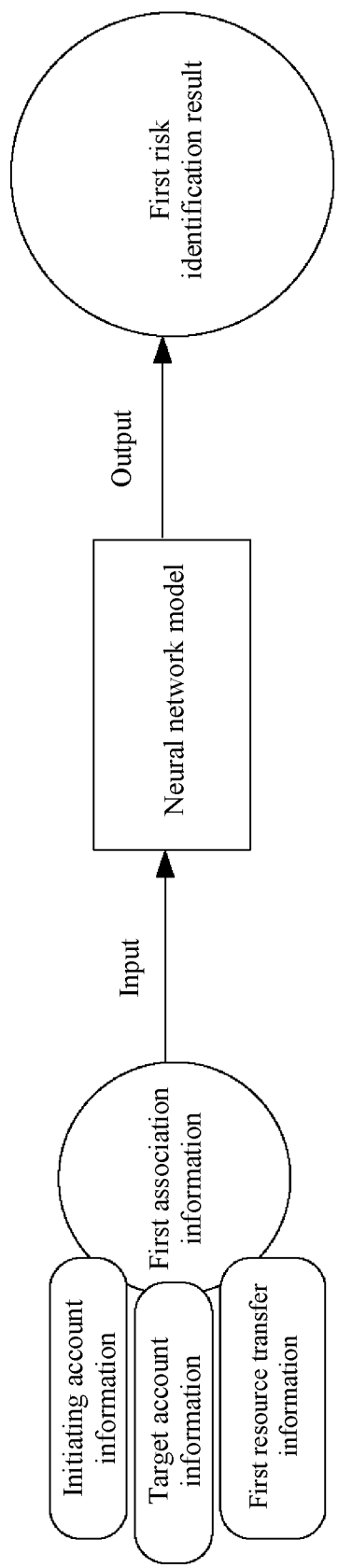
FIG. 2 is a schematic diagram of an implementation principle of determining a first risk identification result in a resource transfer monitoring method, according to an embodiment of the specification.

Then, as shown in FIG. 2, the acquired first association information is input to a pre-trained neural network model, the neural network model acquires a transfer-in risk of the resource transfer-in request score based on the first association information to obtain the first risk identification result. The first risk identification result may be a specific risk value or a risk level. During a specific implementation, the characteristics in multiple dimensions in the first association information are separately scored by using the pre-trained neural network model, and the first risk identification result is determined according to a comprehensive score of the characteristics in multiple dimensions.

Figure 3:
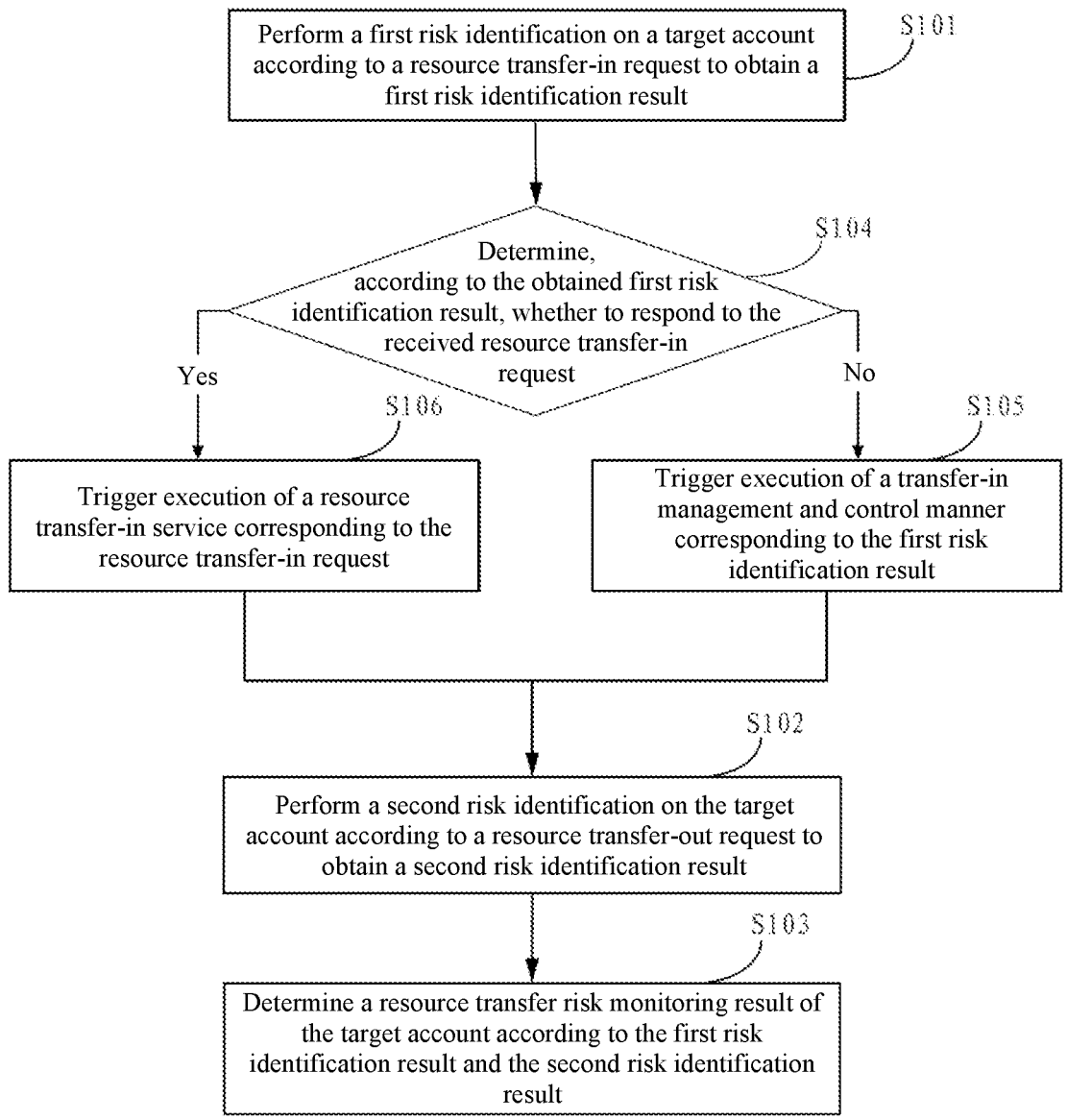
FIG. 3 is a second schematic flowchart of a resource transfer monitoring method, according to an embodiment of the specification.

Further, if a resource transfer-in risk is extremely high, a resource transfer-in transaction needs to be promptly managed and controlled. A specific transfer-in management and control manner may be determined according to an identified transfer-in risk degree, to properly manage and control a transaction activity during a resource transfer from a victim to the target account. Based on this, as shown in FIG. 3, after performing a first risk identification on a target account according to a resource transfer-in request to obtain a first risk identification result in S101, the method further includes S104, determine, according to the obtained first risk identification result, whether to respond to the received resource transfer-in request.

In particular, for example, the obtained first risk identification result is a transfer-in risk level. If the transfer-in risk level is greater than a preset level threshold, it indicates that a possibility that a current resource deposit is fraudulent deposit is larger, responding to a resource transfer-in service needs to be suspended, and a corresponding transfer-in management and control manner is determined to perform management and control promptly.

S105 is performed to trigger execution of a transfer-in management and control manner corresponding to the first risk identification result if it is determined not to respond to or fulfill the resource transfer-in request.

For example, if the transfer-in risk level is greater than a first preset level threshold and less than a second preset level threshold, transfer risk prompt information is sent to the resource transfer-in initiator to prompt the user to be more vigilant. If the transfer-in risk level is greater than the second preset level threshold, it prompts that a current transfer-in transaction fails. During a specific implementation, more preset level thresholds may be set to determine a preset level threshold interval into which the transfer-in risk level falls, and select a transfer-in management and control manner corresponding to the preset level threshold interval.

S106 is performed to trigger execution of a resource transfer-in service corresponding to the resource transfer-in request if it is determined to respond to or fulfill the resource transfer-in request.

The performing a second risk identification on the target account according to a resource transfer-out request to obtain a second risk identification result in S102 specifically includes acquiring second association information related to the resource transfer-out request, wherein the second association information includes at least one of target account information, second resource transfer information, and recipient account information.

In particular, the second association information includes characteristics in multiple dimensions related to the resource transfer-out request. The target account information may include basic account attributes, terminal activities, a terminal environment, and an account evaluation. The basic account attributes include a user name, an opening bank, an account opening date, a historical transaction record, maturity, a current asset, authentication information, subscription information, a contact list, a friend status of a target account, and the like. The terminal activities include a mobile terminal operation record, a browsing record, and a social record. The terminal environment includes an account login device, an account login city, and an overall fraud degree of the account login city. The account evaluation includes an account credit, an account penalty, and an account reporting status. The second resource transfer information may include a resource transfer-out status and a resource expenditure behavior. The recipient account information includes an account credit, an account penalty, an account reporting status, an account receipt status, and the like.

The second risk identification is performed on the target account according to the acquired second association information by using a second risk identification model to obtain the second risk identification result, and the second risk identification model includes a gradient boosting regression tree (GBRT) model.

In particular, the gradient boosting regression tree model is obtained through training in the following manner: acquiring a plurality of transfer-out risk training samples, wherein the transfer-out risk training samples include positive samples representing normal transfer-out transactions and negative samples representing disposal activities; and updating relevant model parameters in the gradient boosting regression tree model through training based on the transfer-out risk training samples, wherein the gradient boosting regression tree model describes a disposal risk characteristic of the recipient's expenditure.

Figure 4:
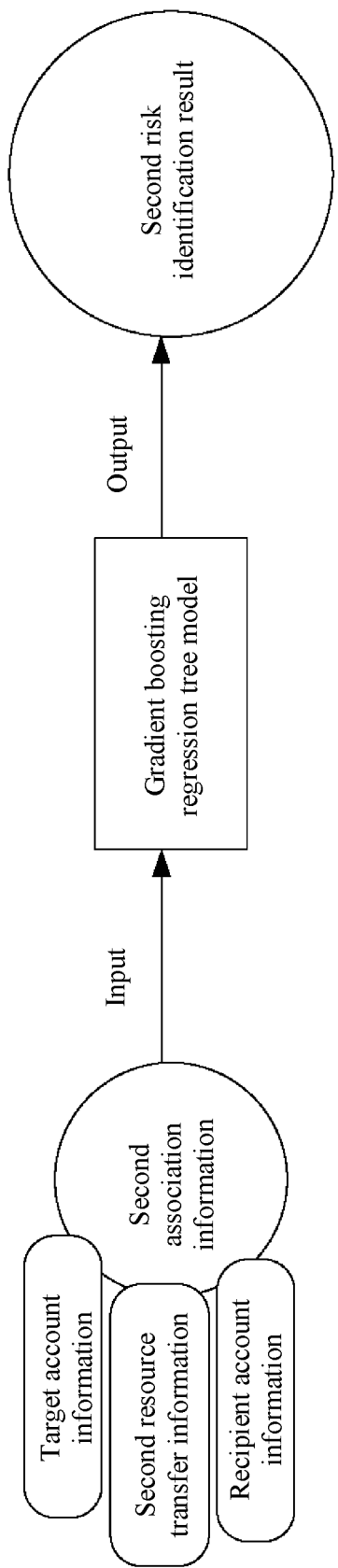
FIG. 4 is a schematic diagram of an implementation principle of determining a second risk identification result in a resource transfer monitoring method, according to an embodiment of the specification.

Then, as shown in FIG. 4, the acquired second association information is input to a pre-trained gradient boosting regression tree model, the gradient boosting regression tree model acquires a transfer-out risk of the resource transfer-out request score based on the second association information to obtain the second risk identification result. The second risk identification result may be a specific risk value or a risk level. During a specific implementation, the characteristics in multiple dimensions in the second association information are separately scored by using the pre-trained gradient boosting regression tree model, and the second risk identification result is determined according to a comprehensive score of the characteristics in multiple dimensions.

Figure 5:
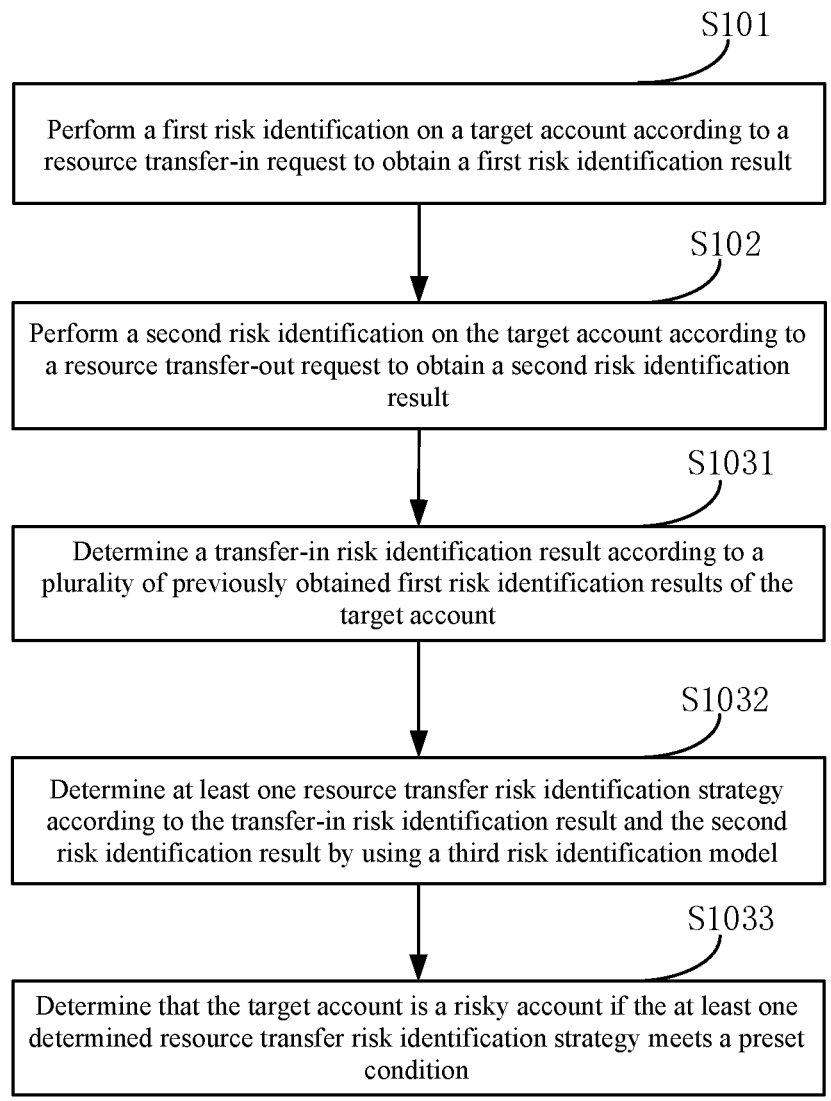
FIG. 5 is a third schematic flowchart of a resource transfer monitoring method, according to an embodiment of the specification.

As shown in FIG. 5, the determining a resource transfer risk monitoring result of the target account according to the first risk identification result and the second risk identification result in S103 specifically includes S1031, determine a transfer-in risk identification result according to a plurality of previously obtained first risk identification results of the target account.

In particular, for a specified target account, when a plurality of resource transfer-in initiators transfer resources to the target account, each resource transfer-in request corresponds to one first risk identification result. The transfer-in risk identification result is determined based on a plurality of first risk identification results. The transfer-in risk identification result may be one identification result in the plurality of first risk identification results, for example, a first risk identification result representing a highest risk degree, or a newly obtained first risk identification result. The transfer-in risk identification result may alternatively be a comprehensive result of the plurality of first risk identification results, for example, a weighted average risk of a plurality of risk identification results, or an accumulative risk of a plurality of risk identification results.

S1032, determine at least one resource transfer risk identification strategy according to the transfer-in risk identification result and the second risk identification result by using a third risk identification model, wherein the third risk identification model may include a classification and regression tree model.

In particular, each determined transfer-in risk identification result and the second risk identification result are combined to form one resource transfer risk identification strategy. For example, resource transfer risk identification strategies include a combination of the first risk identification result representing the highest risk degree and the second risk identification result, a combination of the newly obtained first risk identification result and the second risk identification result, a combination of the weighted average risk of the plurality of first risk identification results and the second risk identification result, and a combination of the accumulative risk of the plurality of first risk identification results and the second risk identification result. If there are more types of determined transfer-in risk identification results, there are more determined resource transfer risk identification strategies.

S1033, determine that the target account is a risky account if the at least one determined resource transfer risk identification strategy meets a preset condition.

In particular, each resource transfer risk identification strategy corresponds to a respective constraint condition, and the constraint condition includes a first constraint condition and a second constraint condition. Different resource transfer risk identification strategies correspond to different first constraint conditions. For a specified resource transfer risk identification strategy, it is determined whether a transfer-in risk identification result meets a first constraint condition corresponding to the resource transfer risk identification strategy, and it is determined whether the second risk identification result meets a second constraint condition corresponding to the resource transfer risk identification strategy. For example, for the combination of the first risk identification result representing the highest risk degree and the second risk identification result, it is determined whether the first risk identification result representing the highest risk degree meets the first constraint condition, and it is determined whether the second risk identification result meets the second constraint condition. If the two conditions are met, it is determined that the resource transfer risk identification strategy meets the preset condition.

In particular, the classification and regression tree model is obtained through training in the following manner: acquiring a plurality of resource transfer risk training samples, wherein the resource transfer risk training samples include historical first risk identification results for fraud activities and historical second risk identification results for disposal activities; obtaining a constraint condition corresponding to each resource transfer risk identification strategy through training based on the resource transfer risk training samples, wherein the constraint condition includes a first constraint condition and a second constraint condition, the first constraint condition corresponding to the transfer-in risk identification result, and the second constraint condition corresponding to the second risk identification result; and updating relevant model parameters in the classification and regression tree model according to the obtained constraint condition corresponding to each resource transfer risk identification strategy, wherein the classification and regression tree model associates a transfer-in risk identification result obtained by using the neural network model with a transfer-out risk identification result obtained by using the gradient boosting regression tree model, to avoid omission of single identification.

Figure 6:
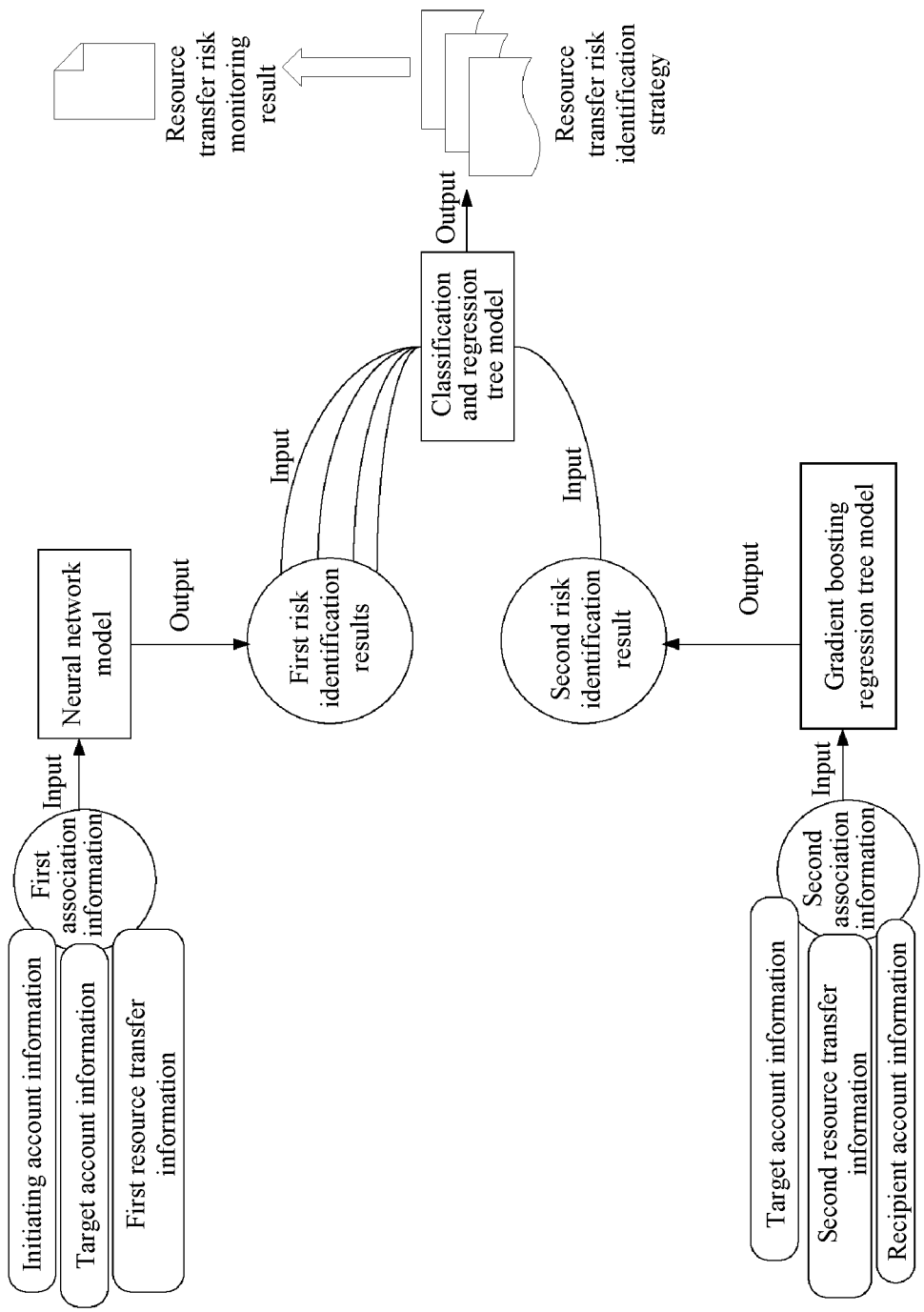
FIG. 6 is a schematic diagram of an implementation principle of determining a resource transfer risk monitoring result in a resource transfer monitoring method, according to an embodiment of the specification.

Then, as shown in FIG. 6, the plurality of previously obtained first risk identification results of the target account and the second risk identification result are input to a pre-trained classification and regression tree model, and output of a plurality of resource transfer risk identification strategies are acquired by using the classification and regression tree model. Whether each resource transfer risk identification strategy meets a corresponding preset condition is determined separately, to obtain the resource transfer risk monitoring result.

In this embodiment provided in the specification, in the process of determining the resource transfer risk monitoring result of the target account according to the first risk identification result and the second risk identification result, the classification and regression tree model (CRT) may be used. Because a selection index of the classification and regression tree model is simple, to-be-identified objects can be classified based on a plurality of simple identification strategies, and a resource transfer risk is comprehensively determined based on the first risk identification result obtained by using the neural network model and the second risk identification result obtained by using the gradient boosting regression tree model, thereby improving accuracy of the resource transfer risk monitoring result.

Figure 7:
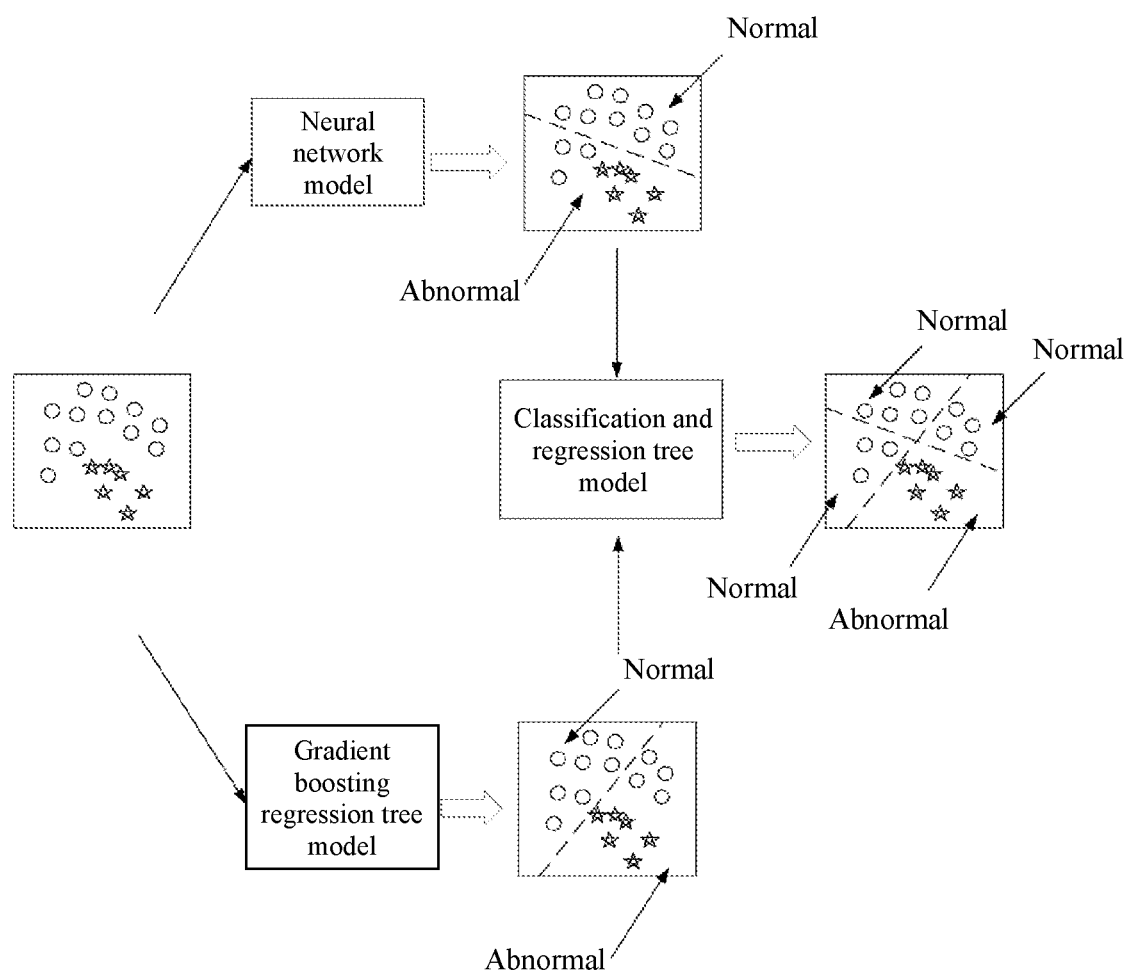
FIG. 7 is a schematic diagram of an implementation principle of performing a resource transfer risk identification on a target account in a resource transfer monitoring method, according to an embodiment of the specification.

FIG. 7 is a schematic diagram of an implementation principle of performing a resource transfer risk identification on a target account. In FIG. 7, there are a plurality of to-be-monitored target users, ☆ represents a risky account with a fraudulent disposal behavior, and O represents a normal account for a legitimate transaction. Learned from identification results obtained by performing an individual risk identification using the neural network model and from identification result obtained by performing an individual risk identification using the gradient boosting regression tree model, there are specified misjudgment rates. Therefore, based on the identification result obtained by performing the individual risk identification using the neural network model and the identification result obtained by performing the individual risk identification using the gradient boosting regression tree model, it can be learned from identification results obtained by performing a comprehensive resource transfer risk identification using the classification and regression tree model that the accuracy of performing the resource transfer risk identification on the target account is improved.

Figure 8:
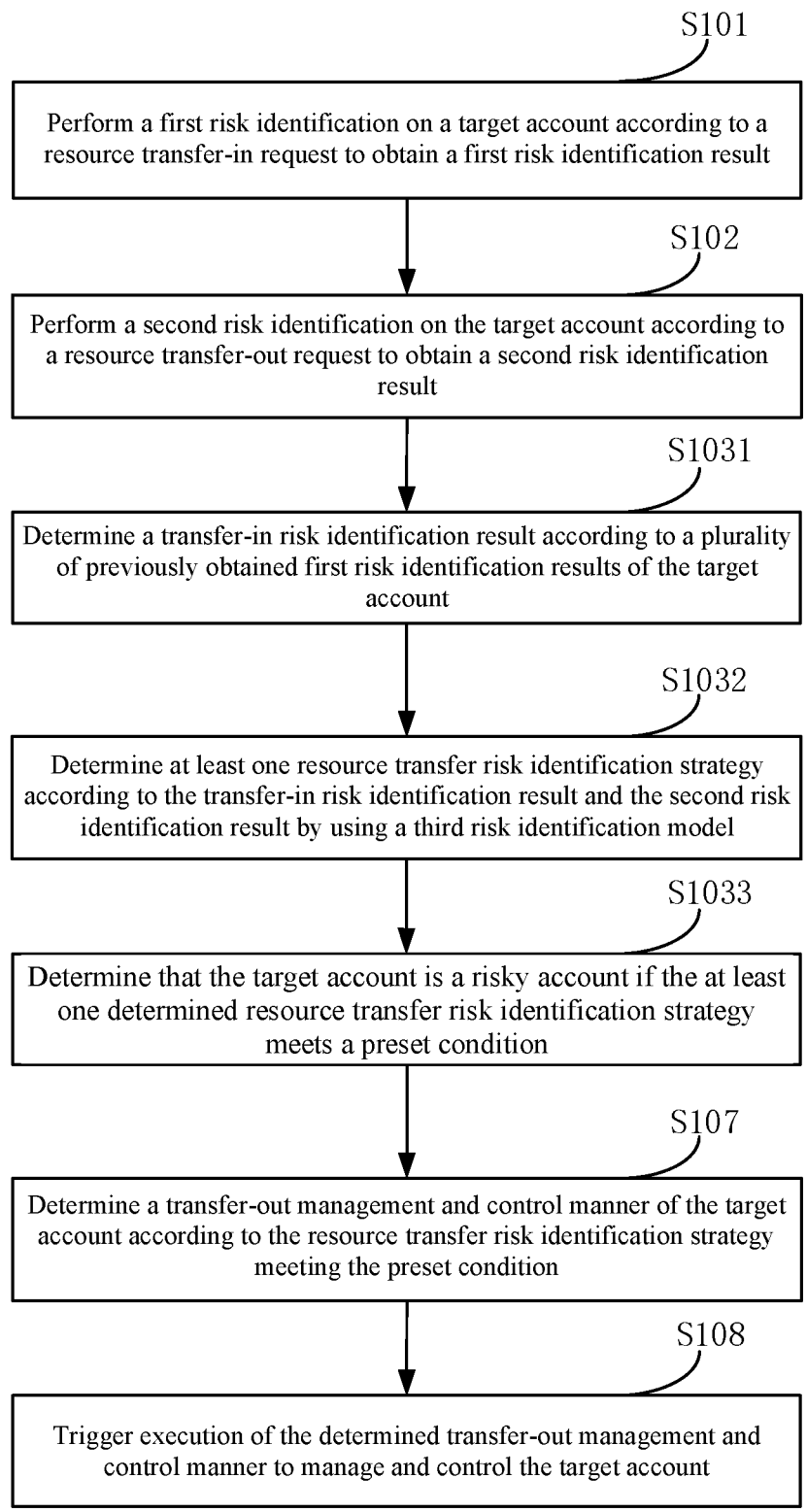
FIG. 8 is a fourth schematic flowchart of a resource transfer monitoring method, according to an embodiment of the specification.

Further, if a resource transfer risk is extremely high, the target account needs to be promptly managed and controlled. A specific management and control manner may be determined according to a determined resource transfer risk degree, to properly manage and control the target account during the resource disposal by a fraudster. Based on this, as shown in FIG. 8, after the determining that the target account is a risky account, the method further includes:

S107, determine a transfer-out management and control manner of the target account according to the resource transfer risk identification strategy meeting the preset condition.

In particular, using the transfer-out management and control manner that is determined based on a quantity of resource transfer risk identification strategies meeting the preset condition as an example, if the quantity of the resource transfer risk identification strategies meeting the preset condition is greater than a preset quantity threshold, it indicates that a possibility that the current resource transfer-out is fraudulent disposal is larger, responding to a resource transfer-out service needs to be suspended, and a corresponding transfer-out management and control manner is determined to promptly perform the account management and control.

S108, trigger execution of the determined transfer-out management and control manner to manage and control the target account.

For example, if the quantity of resource transfer risk identification strategies meeting the preset condition is greater than a first preset quantity threshold and is less than a second preset quantity threshold, an authentication request is sent to the target account to further verify an identity of the resource transfer-out initiator, and the resource transfer-out service is responded if the verification succeeds. If the quantity of resource transfer risk identification strategies meeting the preset condition is greater than the second preset quantity threshold, it indicates that the current transfer-out transaction fails. During a specific implementation, more preset quantity thresholds may be set to determine a preset quantity threshold interval into which the quantity of resource transfer risk identification strategies meeting the preset condition falls, and a transfer-out management and control manner corresponding to the preset quantity threshold interval is selected. In addition, the transfer-out management and control manner may be determined in other manners. For example, the transfer-out management and control manner is determined according to a type of a resource transfer risk identification strategy meeting the preset condition.

According to the resource transfer monitoring method in this embodiment of the specification, the first risk identification is performed on the target account according to the resource transfer-in request to obtain the first risk identification result, the second risk identification is performed on the target account according to the resource transfer-out request to obtain the second risk identification result, and the resource transfer risk monitoring result of the target account is determined according to the first risk identification result and the second risk identification result. According to the embodiments of the specification, real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in risk identification result and a transfer-out risk identification result, thereby improving accuracy of determination of fraud and disposal activities.

Figure 9:
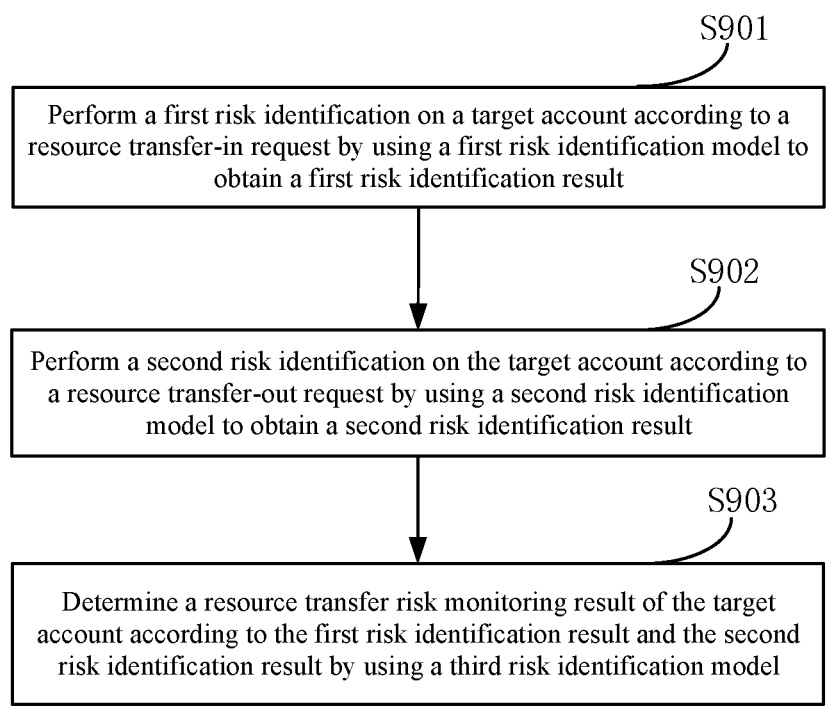
FIG. 9 is a first schematic flowchart of a resource transfer monitoring method, according to another embodiment of the specification.

Corresponding to the resource transfer monitoring method described in FIG. 1 to FIG. 8, based on a same technical concept, another embodiment of the specification further provides a resource transfer monitoring method. FIG. 9 is a first schematic flowchart of a resource transfer monitoring method, according to an embodiment of the specification. The method in FIG. 9 may be executed by a server or a terminal device. The server may be an independent server or a server cluster including a plurality of servers. As shown in FIG. 9, the method includes at least the following steps.

S901, perform a first risk identification on a target account according to a resource transfer-in request by using a first risk identification model to obtain a first risk identification result. The resource transfer-in request comprises an identifier of a resource transfer-in initiator and an identifier of a resource transfer-in recipient (namely, an identifier of the target account). In particular, for example, the resource transfer-in initiator makes a remittance to the target account. When a remittance transfer-in request is received, a fraud risk identification is first performed on a current remittance transaction by using the first risk identification model to obtain a fraud risk identification result, that is, whether there is a fraud risk in the current remittance transaction is determined. Then, it is determined whether the current remittance transaction is a fraudulent remittance to the target account that is provided by a victim for a fraudster when the victim is deceived, or is a normal remittance to a legitimate account provided for the resource transfer-in recipient when the resource transfer-in initiator is informed.

In particular, for a specific implementation of step S901, the reference is made to step S101, and the details are not described herein again.

S902, perform a second risk identification on the target account according to a resource transfer-out request by using a second risk identification model to obtain a second risk identification result. For a cash withdrawal transaction, the resource transfer-out request comprises an identifier of a resource transfer-out initiator (namely, an identifier of the target account). For a transfer transaction, the resource transfer-out request comprises an identifier of a resource transfer-out initiator (namely, an identifier of the target account) and an identifier of a resource transfer-out recipient. In particular, for example, a remittance is made from the target account to the resource transfer-out recipient. When a transfer request is received, a disposal risk identification is first performed on a current transfer transaction by using the second risk identification model to obtain a disposal risk identification result, that is, a disposal risk degree in the current transfer transaction is determined.

In particular, for a specific implementation of step S902, the reference is made to step S102, and the details are not described herein again.

S903, determine a resource transfer risk monitoring result of the target account according to the first risk identification result and the second risk identification result by using a third risk identification model. For a specified target account, when a plurality of resource transfer-in initiators transfer resources to the target account, each resource transfer-in request corresponds to one first risk identification result obtained by using the first risk identification model. After the plurality of resource transfer-in initiators transfer the resources to the target account, when the target account initiates a resource transfer-out request, a second risk identification result is first obtained based on the resource transfer-out request by using the second risk identification model. Then, fraud or disposal risk is comprehensively determined based on a plurality of previously obtained first risk identification results and the second risk identification result by using the third risk identification model. Finally, it is determined whether the resource transfer-out request has a resource transfer risk, to further determine whether the current resource transfer-out is an illegal disposal of an illegal income from the target account by a fraudster or a normal withdrawal of a legitimate income from the target account by a user.

In particular, for a specific implementation of step S903, the reference is made to step S103, and the details are not described herein again.

According to this embodiment of the specification, the first risk identification is performed on the target account according to the resource transfer-in request by using the first risk identification model to obtain the first risk identification result, the second risk identification is performed on the target account according to the resource transfer-out request by using the second risk identification model to obtain the second risk identification result, and the resource transfer risk monitoring result of the target account is determined according to the first risk identification result and the second risk identification result by using the third risk identification model. In this way, real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in risk identification result and a transfer-out risk identification result, thereby improving accuracy of determination of fraud and disposal activities.

The first risk identification model, the second risk identification model, or the second risk identification model at least meets the following condition, the first risk identification model includes a neural network model, the second risk identification model includes a gradient boosting regression tree model, or the second risk identification model includes a classification and regression tree model.

Preferably, in the process of determining the resource transfer risk monitoring result of the target account according to the first risk identification result and the second risk identification result, the classification and regression tree model (CRT) is used. Because a selection index of the classification and regression tree model is simple, to-be-identified objects can be classified based on a plurality of simple identification strategies, and a resource transfer risk is comprehensively determined based on the first risk identification result obtained by using the neural network model and the second risk identification result obtained by using the gradient boosting regression tree model, thereby improving accuracy of the resource transfer risk monitoring result.

Figure 10:
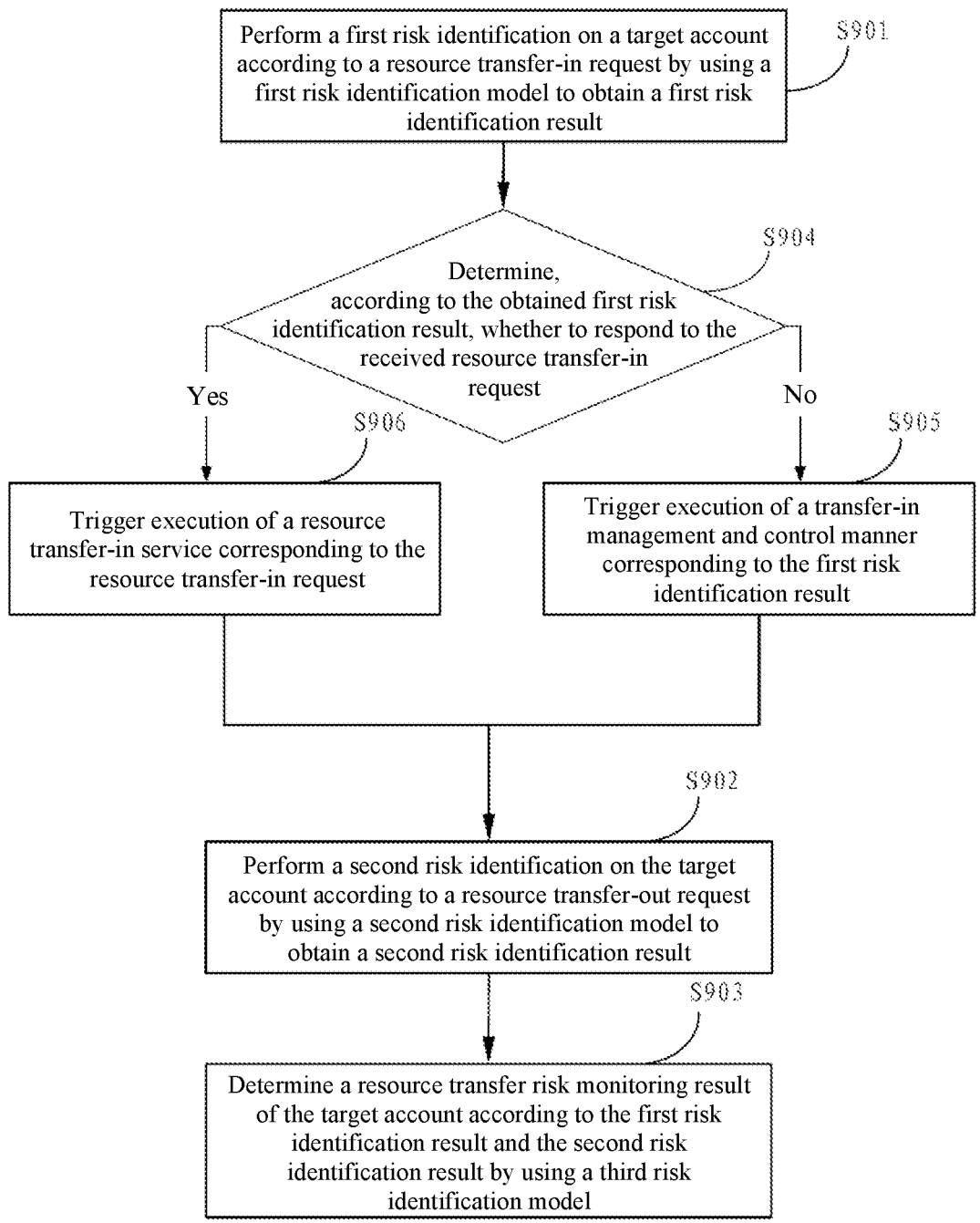
FIG. 10 is a second schematic flowchart of a resource transfer monitoring method, according to another embodiment of the specification.

Further, if a resource transfer-in risk is extremely high, a resource transfer-in transaction needs to be promptly managed and controlled. A specific transfer-in management and control manner may be determined according to an identified transfer-in risk degree, to properly manage and control a transaction activity during the resource transfer from a victim to the target account. Based on this, as shown in FIG. 10, after the performing a first risk identification on a target account according to a resource transfer-in request by using a first risk identification model to obtain a first risk identification result in S901, the method further includes S904, determine, according to the obtained first risk identification result, whether to respond to the received resource transfer-in request. For a specific implementation of step S904, the reference is made to step S104, and the details are not described herein again.

S905 is performed to trigger execution of a transfer-in management and control manner corresponding to the first risk identification result if it is determined not to respond to the resource transfer-in request. For a specific implementation of step S905, the reference is made to step S105, and the details are not described herein again.

S906 is performed to trigger execution of a resource transfer-in service corresponding to the resource transfer-in request if it is determined to respond to the resource transfer-in request. For a specific implementation of step S906, the reference is made to step S106, and the details are not described herein again.

Figure 11:
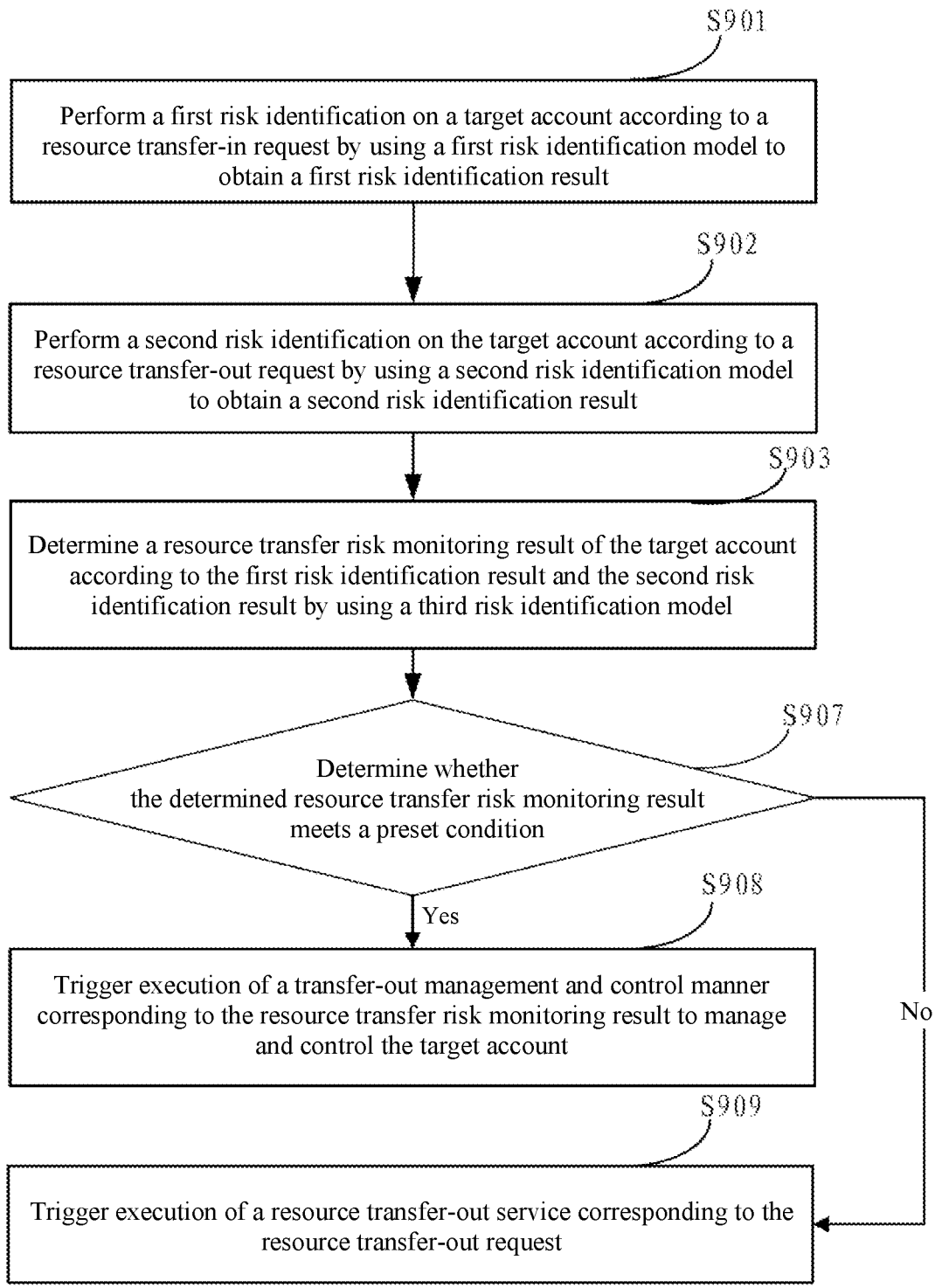
FIG. 11 is a third schematic flowchart of a resource transfer monitoring method, according to another embodiment of the specification.

Further, if a resource transfer risk is extremely high, the target account needs to be promptly managed and controlled. A specific management and control manner may be determined according to the determined resource transfer risk, to properly manage and control the target account during resource disposal by a fraudster. Based on this, as shown in FIG. 11, after the determining a resource transfer risk monitoring result of the target account, the method further includes S907. D, determine whether the determined resource transfer risk monitoring result meets a preset condition, wherein the resource transfer risk monitoring result includes an identification result of each resource transfer risk identification strategy.

If the determined resource transfer risk monitoring result meets the preset condition, S908 is performed to trigger execution of a transfer-out management and control manner corresponding to the resource transfer risk monitoring result to manage and control the target account. For a specific implementation of step S908, the reference is made to step S107 to S108, and the details are not described herein again.

If the determined resource transfer risk monitoring result does not meet the preset condition, S909 is performed to trigger execution of a resource transfer-out service corresponding to the resource transfer-out request.

According to the resource transfer monitoring method in this embodiment of the specification, the first risk identification is performed on the target account according to the resource transfer-in request by using the first risk identification model to obtain the first risk identification result, the second risk identification is performed on the target account according to the resource transfer-out request by using the second risk identification model to obtain the second risk identification result, and the resource transfer risk monitoring result of the target account is determined according to the first risk identification result and the second risk identification result by using the third risk identification model. According to the embodiments of the specification, real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in risk identification result and a transfer-out risk identification result, thereby improving accuracy of determination of fraud and disposal activities.

The above embodiment of the specification and a previous embodiment of the specification are based on a same inventive concept. Therefore, for specific implementation of this embodiment, the reference is made to the implementation of the foregoing resource transfer monitoring method, and corresponding parts are not described again.

Figure 12:
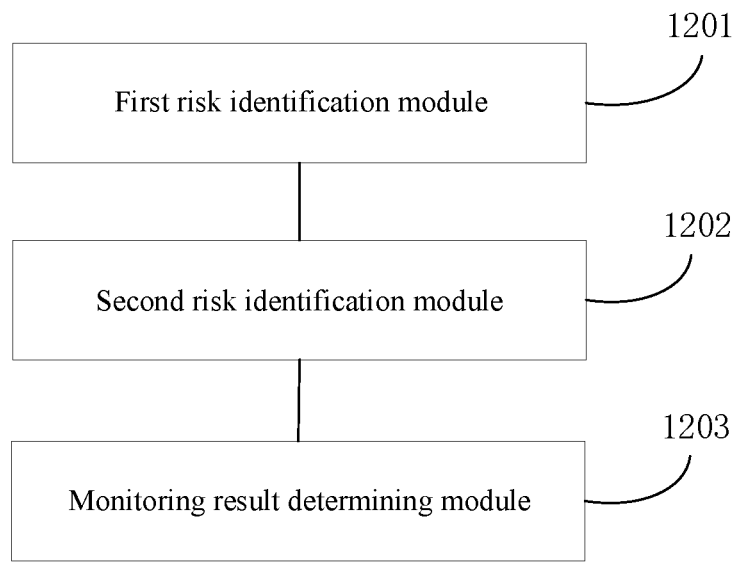
FIG. 12 is a first schematic diagram of a module composition of a resource transfer monitoring device, according to an embodiment of the specification.

Corresponding to the foregoing resource transfer monitoring method described in FIG. 1 to FIG. 8, based on a same technical concept, an embodiment of the specification further provides a resource transfer monitoring device. FIG. 12 is a first schematic diagram of a module composition of a resource transfer monitoring device, according to an embodiment of the specification. The device is configured to perform the resource transfer monitoring method described in FIG. 1 to FIG. 8. As shown in FIG. 12, the device includes a first risk identification module 1201, a second risk identification module 1202, and a monitoring result determining module 1203. The first risk identification module 1201, the second risk identification module 1202, and the monitoring result determining module 1203 are sequentially connected.

In a specific embodiment, the first risk identification module 1201 is configured to perform a first risk identification on a target account according to a resource transfer-in request to obtain a first risk identification result.

The second risk identification module 1202 is configured to perform a second risk identification on the target account according to a resource transfer-out request to obtain a second risk identification result.

The monitoring result determining module 1203 is configured to determine a resource transfer risk monitoring result of the target account according to the first risk identification result and the second risk identification result.

In an embodiment, the first risk identification module 1201 is specifically configured to:

acquire first association information related to the resource transfer-in request, wherein the first association information includes at least one of initiating account information, target account information, and first resource transfer information; and perform a first risk identification on the target account according to the first association information by using a neural network model to obtain the first risk identification result.

Figure 13:
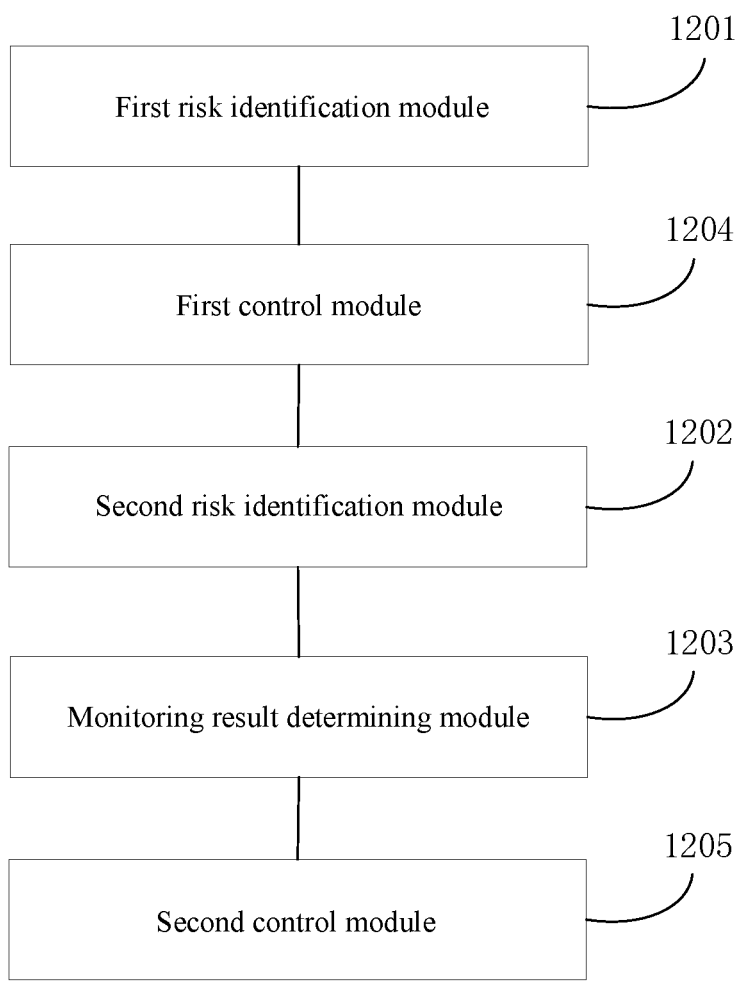
FIG. 13 is a second schematic diagram of a module composition of a resource transfer monitoring device, according to an embodiment of the specification.

In an embodiment, as shown in FIG. 13, the device further includes a first control module 1204 configured to determine, according to the first risk identification result, whether to respond to the resource transfer-in request, and trigger execution of a transfer-in management and control manner corresponding to the first risk identification result if it is determined not to respond to the resource transfer-in request.

In an embodiment, the second risk identification module 1202 is specifically configured to: acquire second association information related to the resource transfer-out request, wherein the second association information includes at least one of target account information, second resource transfer information, and recipient account information; and perform a second risk identification on the target account according to the second association information by using a gradient boosting regression tree model to obtain the second risk identification result.

In an embodiment, the monitoring result determining module 1203 is specifically configured to: determine a transfer-in risk identification result according to a plurality of previously obtained first risk identification results of the target account; determine at least one resource transfer risk identification strategy according to the transfer-in risk identification result and the second risk identification result by using a classification and regression tree model; and determine that the target account is a risky account if the at least one resource transfer risk identification strategy meets a preset condition.

In an embodiment, the device further includes a second control module 1205 configured to: after it is determined that the target account is a risky account, determine a transfer-out management and control manner of the target account according to the resource transfer risk identification strategy meeting the preset condition; and trigger execution of the transfer-out management and control manner to manage and control the target account.

According to the resource transfer monitoring device in this embodiment of the specification, the first risk identification is performed on the target account according to the resource transfer-in request to obtain the first risk identification result; the second risk identification is performed on the target account according to the resource transfer-out request to obtain the second risk identification result; and the resource transfer risk monitoring result of the target account is determined according to the first risk identification result and the second risk identification result. According to the embodiments of the specification, real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in risk identification result and a transfer-out risk identification result, thereby improving accuracy of determination of fraud and disposal activities.

In another specific embodiment, the first risk identification module 1201 is configured to perform a first risk identification on a target account according to a resource transfer-in request by using a first risk identification model to obtain a first risk identification result.

The second risk identification module 1202 is configured to perform a second risk identification on the target account according to a resource transfer-out request by using a second risk identification model to obtain a second risk identification result.

The monitoring result determining module 1203 is configured to determine a resource transfer risk monitoring result of the target account according to the first risk identification result and the second risk identification result by using a third risk identification model.

In an embodiment, the first risk identification model, the second risk identification model, or the second risk identification model at least meets the following condition, the first risk identification model is a neural network model, the second risk identification model is a gradient boosting regression tree model, or the second risk identification model is a classification and regression tree model.

In an embodiment, the device further includes a first control module 1204 configured to: determine, according to the first risk identification result, whether to respond to the resource transfer-in request; and trigger execution of a transfer-in management and control manner corresponding to the first risk identification result if it is determined not to respond to the resource transfer-in request.

In an embodiment, the device further includes a second control module 1205 configured to, if the resource transfer risk monitoring result meets a preset condition, trigger execution of a transfer-out management and control manner corresponding to the resource transfer risk monitoring result to manage and control the target account.

According to the resource transfer monitoring device in this embodiment of the specification, the first risk identification is performed on the target account according to the resource transfer-in request by using the first risk identification model to obtain the first risk identification result; the second risk identification is performed on the target account according to the resource transfer-out request by using the second risk identification model to obtain the second risk identification result; and the resource transfer risk monitoring result of the target account is determined according to the first risk identification result and the second risk identification result by using the third risk identification model. According to the embodiments of the specification, real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in risk identification result and a transfer-out risk identification result, thereby improving accuracy of determination of fraud and disposal activities.

The resource transfer monitoring device provided in this embodiment of the specification and the foregoing resource transfer monitoring method are based on a same inventive concept. Therefore, for a specific implementation of this embodiment, the reference is made to the implementation of the foregoing resource transfer monitoring method, and corresponding parts are not described again.

Figure 14:
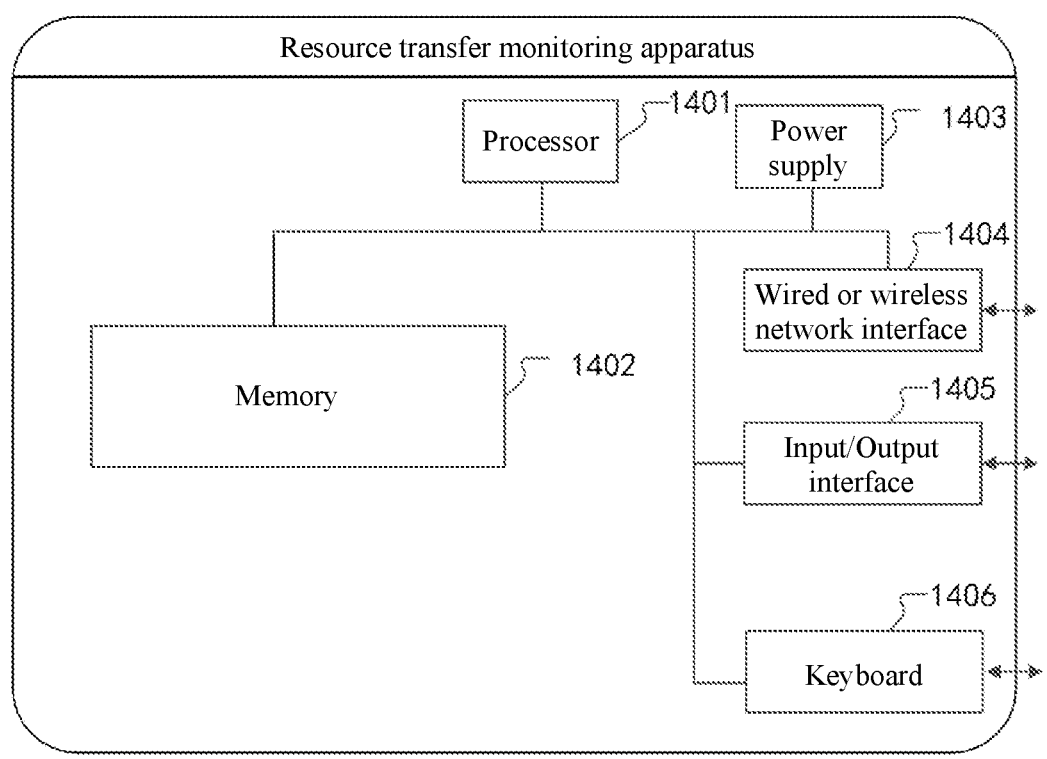
FIG. 14 is a schematic structural diagram of a resource transfer monitoring apparatus, according to an embodiment of the specification.

Further, corresponding to the foregoing method shown in FIG. 1 to FIG. 8, based on a same technical concept, an embodiment of the specification further provides a resource transfer monitoring apparatus. The apparatus is configured to perform the foregoing resource transfer monitoring method, as shown in FIG. 14.

The resource transfer monitoring apparatus may vary considerably depending on configuration or performance, and may include one or more processors 1401 and a memory 1402. The memory 1402 may store one or more application programs or data. The memory 1402 may provide transitory storage or persistent storage. The application program stored in the memory 1402 may include one or more modules (not shown in the figure), and each module may include a series of computer-executable instructions in the resource transfer monitoring apparatus. Further, the processor 1401 may be configured to communicate with the memory 1402 to execute the series of computer-executable instructions in the memory 1402 on the resource transfer monitoring apparatus. The resource transfer monitoring apparatus may further include one or more power supplies 1403, one or more wired or wireless network interfaces 1404, one or more input/output interfaces 1405, one or more keyboards 1406, and the like.

In a specific embodiment, the resource transfer monitoring apparatus includes a memory and one or more programs. The one or more programs are stored in the memory, and may include one or one modules. Each module may include a series of computer-executable instructions in the resource transfer monitoring apparatus. The one or more programs, which are configured to be executed by one or more processors, include the following computer-executable instruction for: performing a first risk identification on a target account according to a resource transfer-in request to obtain a first risk identification result; performing a second risk identification on the target account according to a resource transfer-out request to obtain a second risk identification result; and determining a resource transfer risk monitoring result of the target account according to the first risk identification result and the second risk identification result.

According to the embodiments of the specification, real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in risk identification result and a transfer-out risk identification result, thereby improving accuracy of determination of fraud and disposal activities.

In an embodiment, when the computer-executable instruction is executed, the performing a first risk identification on a target account according to a resource transfer-in request to obtain a first risk identification result includes: acquiring first association information related to the resource transfer-in request, wherein the first association information includes at least one of initiating account information, target account information, and first resource transfer information; and performing a first risk identification on the target account according to the first association information by using a neural network model to obtain the first risk identification result.

In an embodiment, when the computer-executable instruction is executed, the program further includes the following computer-executable instruction for: after the performing a first risk identification on a target account according to a resource transfer-in request to obtain a first risk identification result determining, according to the first risk identification result, whether to respond to the resource transfer-in request; and triggering execution of a transfer-in management and control manner corresponding to the first risk identification result if it is determined not to respond to the resource transfer-in request.

In an embodiment, when the computer-executable instruction is executed, the performing a second risk identification on the target account according to a resource transfer-out request to obtain a second risk identification result includes: acquiring second association information related to the resource transfer-out request, wherein the second association information includes at least one of target account information, second resource transfer information, and recipient account information; and performing a second risk identification on the target account according to the second association information by using a gradient boosting regression tree model to obtain the second risk identification result.

In an embodiment, when the computer-executable instruction is executed, the determining a resource transfer risk monitoring result of the target account according to the first risk identification result and the second risk identification result includes: determining a transfer-in risk identification result according to a plurality of previously obtained first risk identification results of the target account; determining at least one resource transfer risk identification strategy according to the transfer-in risk identification result and the second risk identification result by using a classification and regression tree model; and determining that the target account is a risky account if the at least one resource transfer risk identification strategy meets a preset condition.

In an embodiment, when the computer-executable instruction is executed, the program further includes the following computer-executable instruction for: after the determining that the target account is a risky account, determining a transfer-out management and control manner of the target account according to the resource transfer risk identification strategy meeting the preset condition; and triggering execution of the transfer-out management and control manner to manage and control the target account.

According to the resource transfer monitoring apparatus in this embodiment of the specification, the first risk identification is performed on the target account according to the resource transfer-in request to obtain the first risk identification result, the second risk identification is performed on the target account according to the resource transfer-out request to obtain the second risk identification result, and the resource transfer risk monitoring result of the target account is determined according to the first risk identification result and the second risk identification result. According to the resource transfer monitoring apparatus in this embodiment of the specification, real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in risk identification result and a transfer-out risk identification result, thereby improving accuracy of determination of fraud and disposal activities.

In another specific embodiment, the resource transfer monitoring apparatus includes a memory and one or more programs. The one or more programs are stored in the memory, and may include one or one modules. Each module may include a series of computer-executable instructions in the resource transfer monitoring apparatus. The one or more programs, which are configured to be executed by one or more processors, include the following computer-executable instruction for: performing a first risk identification on a target account according to a resource transfer-in request by using a first risk identification model to obtain a first risk identification result; performing a second risk identification on the target account according to a resource transfer-out request by using a second risk identification model to obtain a second risk identification result; and determining a resource transfer risk monitoring result of the target account according to the first risk identification result and the second risk identification result by using a third risk identification model.

According to the embodiments of the specification, real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in risk identification result and a transfer-out risk identification result, thereby improving accuracy of determination of fraud and disposal activities.

In an embodiment, when the computer-executable instruction is executed, at least one of the first risk identification model, the second risk identification model, and the second risk identification model meets the following condition:

the first risk identification model is a neural network model, the second risk identification model is a gradient boosting regression tree model, or the second risk identification model is a classification and regression tree model.

In an embodiment, when the computer-executable instruction is executed, the program further includes the following computer-executable instruction for: after the performing a first risk identification on a target account according to a resource transfer-in request by using a first risk identification model to obtain a first risk identification result, determining, according to the first risk identification result, whether to respond to the resource transfer-in request; and triggering execution of a transfer-in management and control manner corresponding to the first risk identification result if it is determined not to respond to the resource transfer-in request.

In an embodiment, when the computer-executable instruction is executed, the program further includes the following computer-executable instruction for, after the determining a resource transfer risk monitoring result of the target account, if the resource transfer risk monitoring result meets a preset condition, triggering execution of a transfer-out management and control manner corresponding to the resource transfer risk monitoring result to manage and control the target account.

According to the resource transfer monitoring apparatus in this embodiment of the specification, the first risk identification is performed on the target account according to the resource transfer-in request by using the first risk identification model to obtain the first risk identification result, the second risk identification is performed on the target account according to the resource transfer-out request by using the second risk identification model to obtain the second risk identification result, and the resource transfer risk monitoring result of the target account is determined according to the first risk identification result and the second risk identification result by using the third risk identification model. According to the resource transfer monitoring apparatus in this embodiment of the specification, real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in risk identification result and a transfer-out risk identification result, thereby improving accuracy of fraud and disposal activity determination.

The resource transfer monitoring apparatus provided in this embodiment of the specification and the foregoing resource transfer monitoring method are based on a same inventive concept. Therefore, for specific implementation of this embodiment, the reference is made to the implementation of the foregoing resource transfer monitoring method, and corresponding parts are not described again.

Further, corresponding to the method shown in FIG. 1 to FIG. 8, based on a same technical concept, an embodiment of the specification further provides a storage medium for storing a computer-executable instruction. In a specific embodiment, the storage medium may be a U disk, an optical disk, a hard disk, or the like. When the computer-executable instruction stored in the storage medium is executed by a processor, the following procedures can be implemented: performing a first risk identification on a target account according to a resource transfer-in request to obtain a first risk identification result; performing a second risk identification on the target account according to a resource transfer-out request to obtain a second risk identification result; and determining a resource transfer risk monitoring result of the target account according to the first risk identification result and the second risk identification result.

According to the embodiments of the specification, real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in risk identification result and a transfer-out risk identification result, thereby improving accuracy of fraud and disposal activity determination.

In an embodiment, when the computer-executable instruction stored in the storage medium is executed by the processor, the performing a first risk identification on a target account according to a resource transfer-in request to obtain a first risk identification result includes: acquiring first association information related to the resource transfer-in request, wherein the first association information includes at least one of initiating account information, target account information, and first resource transfer information; and performing a first risk identification on the target account according to the first association information by using a neural network model to obtain the first risk identification result.

In an embodiment, when the computer-executable instruction stored in the storage medium is executed by the processor, the following procedures are further implemented: after the performing a first risk identification on a target account according to a resource transfer-in request to obtain a first risk identification result, determining, according to the first risk identification result, whether to respond to the resource transfer-in request; and triggering execution of a transfer-in management and control manner corresponding to the first risk identification result if it is determined not to respond to the resource transfer-in request.

In an embodiment, when the computer-executable instruction stored in the storage medium is executed by the processor, the performing a second risk identification on the target account according to a resource transfer-out request to obtain a second risk identification result includes: acquiring second association information related to the resource transfer-out request, wherein the second association information includes at least one of target account information, second resource transfer information, and recipient account information; and performing a second risk identification on the target account according to the second association information by using a gradient boosting regression tree model to obtain the second risk identification result.

In an embodiment, when the computer-executable instruction stored in the storage medium is executed by the processor, the determining a resource transfer risk monitoring result of the target account according to the first risk identification result and the second risk identification result includes: determining a transfer-in risk identification result according to a plurality of previously obtained first risk identification results of the target account; determining at least one resource transfer risk identification strategy according to the transfer-in risk identification result and the second risk identification result by using a classification and regression tree model; and determining that the target account is a risky account if the at least one resource transfer risk identification strategy meets a preset condition.

In an embodiment, when the computer-executable instruction stored in the storage medium is executed by the processor, the following procedures are further implemented: after the determining that the target account is a risky account, determining a transfer-out management and control manner of the target account according to the resource transfer risk identification strategy meeting the preset condition; and triggering execution of the transfer-out management and control manner to manage and control the target account.

When the computer-executable instruction stored in the storage medium in this embodiment of the specification is executed by the processor, the first risk identification is performed on the target account according to the resource transfer-in request to obtain the first risk identification result; the second risk identification is performed on the target account according to the resource transfer-out request to obtain the second risk identification result; and the resource transfer risk monitoring result of the target account is determined according to the first risk identification result and the second risk identification result. According to the storage medium in this embodiment of the specification, real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in risk identification result and a transfer-out risk identification result, thereby improving accuracy of fraud and disposal activity determination.

In another specific embodiment, the storage medium may be a U disk, an optical disk, a hard disk, etc. When the computer-executable instruction stored in the storage medium is executed by a processor, the following procedures can be implemented:

performing a first risk identification on a target account according to a resource transfer-in request by using a first risk identification model to obtain a first risk identification result;

performing a second risk identification on the target account according to a resource transfer-out request by using a second risk identification model to obtain a second risk identification result; and determining a resource transfer risk monitoring result of the target account according to the first risk identification result and the second risk identification result by using a third risk identification model.

According to the embodiments of the specification, real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in risk identification result and a transfer-out risk identification result, thereby improving accuracy of fraud and disposal activity determination.

In an embodiment, when the computer-executable instruction stored in the storage medium is executed by the processor, at least one of the first risk identification model, the second risk identification model, and the second risk identification model meets the following condition:

the first risk identification model is a neural network model, the second risk identification model is a gradient boosting regression tree model, or the second risk identification model is a classification and regression tree model.

In an embodiment, when the computer-executable instruction stored in the storage medium is executed by the processor, the following procedures are further implemented:

after the performing a first risk identification on a target account according to a resource transfer-in request by using a first risk identification model to obtain a first risk identification result, determining, according to the first risk identification result, whether to respond to the resource transfer-in request; and triggering execution of a transfer-in management and control manner corresponding to the first risk identification result if it is determined not to respond to the resource transfer-in request.

In an embodiment, when the computer-executable instruction stored in the storage medium is executed by the processor, the following procedures are further implemented:

after the determining a resource transfer risk monitoring result of the target account, if the resource transfer risk monitoring result meets a preset condition, triggering execution of a transfer-out management and control manner corresponding to the resource transfer risk monitoring result to manage and control the target account.

When the computer-executable instruction stored in the storage medium in this embodiment of the specification is executed by the processor, the first risk identification is performed on the target account according to the resource transfer-in request by using the first risk identification model to obtain the first risk identification result; the second risk identification is performed on the target account according to the resource transfer-out request by using the second risk identification model to obtain the second risk identification result; and the resource transfer risk monitoring result of the target account is determined according to the first risk identification result and the second risk identification result by using the third risk identification model. According to the storage medium in this embodiment of the specification, real-time resource transfer of a target account can be automatically monitored, and doubtful accounts with fraud and disposal activities can be promptly found, thereby reducing losses of victims to a maximum extent. Besides, a final resource transfer risk monitoring result is determined based on a transfer-in risk identification result and a transfer-out risk identification result, thereby improving accuracy of fraud and disposal activity determination.

The storage medium provided in this embodiment of the specification and the foregoing resource transfer monitoring method are based on a same inventive concept. Therefore, for specific implementation of this embodiment, the reference is made to the implementation of the foregoing resource transfer monitoring method, and repeated parts are not described again.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced boolean expression language (ABEL), altera hardware description language (AHDL), Confluence, cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in implementation of the specification, the function of the units may be implemented in a same piece of or multiple pieces of software and/or hardware.

The specification is described with reference to flowcharts and/or block diagrams of the method, the device (system), and the computer program product in the embodiments of the specification. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, wherein the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include, among computer readable media, a non-persistent memory such as a random access memory (RAM) and/or a non-volatile memory such as a read-only memory (ROM) or a flash memory (flash RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition herein, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

A person skilled in the art should understand that the embodiments of the specification may be provided as a method, a system, or a computer program product. Therefore, the specification may use a form of hardware only embodiments, software only embodiments, or embodiments with a combination of software and hardware. In addition, the specification may use a form of a computer program product implemented on one or more computer available storage media (including but not limited to a disk memory, a CD-ROM, an optical memory, and the like) including computer available program code.

The specification can be described in the general context of computer executable instructions executed by a computer, for example, a program module. Generally, the program module includes a routine, a program, an object, a component, a data structure, and the like for executing a particular task or implementing a particular abstract data type. The specification can also be practiced in a distributed computing environment in which tasks are performed by remote processing devices that are connected through a communication network. In a distributed computing environment, the program module may be located in both local and remote computer storage media including storage devices.

The embodiments in this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of the specification and are not intended to limit the specification. For a person skilled in the art, various modifications and variations can be made to the specification. Any modification, equivalent replacement, or improvement made without departing from the spirit and principle of the specification shall fall within the scope of the claims of the specification.

What is claimed is:

1. A method for monitoring a resource transaction, comprising:

training, by a processor, a first model with deposit risk training samples consisting of normal deposit transaction samples and fraud deposit transaction samples to obtain a neural network model of resource deposits and to output first risk identification results of the resource deposits from the neural network model, training a second model with withdrawal risk training samples consisting of normal withdrawal transaction samples and disposal transaction samples to obtain a gradient boosting regression model of resource withdrawals and to output second risk identification results of the resource withdrawals from the gradient boosting regression model, and training a third model with samples of the first risk identification results and samples of the second risk identification results to obtain a classification and regression tree model of resource disposals, wherein the deposit risk training samples are different from the withdrawal risk training samples;

receiving, by the processor, a resource deposit request for a resource deposit from a terminal of a resource deposit initiator, and the resource deposit request comprising an identifier of the resource deposit initiator and an identifier of a target account in which a resource is deposited;

performing, by the processor using the neural network model, a first risk identification on the target account according to the resource deposit request by at least inputting first association information related to the resource deposit request to the neural network model and outputting a first risk identification result of the resource deposit from the neural network model;

determining, by the processor, whether the resource deposit request is a fraudulent deposit request based on the first risk identification result of the resource deposit request;

in response to determining that the resource deposit request is not a fraudulent deposit request, obtaining, by the processor, first risk identification results of resource deposits being previously deposited into the target account, wherein the neural network model outputs the first risk identification results of the resource deposits being previously deposited into the target account;

receiving, by the processor, a resource withdrawal request for a resource withdrawal from a terminal of a resource withdrawal initiator, the resource withdrawal request comprising an identifier of the resource withdrawal initiator and an identifier of a recipient account, the resource withdrawal request requesting a resource withdrawal from the target account to the recipient account;

performing, by the processor using the gradient boosting regression model, a second risk identification on the target account according to the resource withdrawal request by at least inputting second association information related to the resource withdrawal request to the gradient boosting regression model and outputting a second risk identification result of the resource withdrawal from the gradient boosting regression model;

determining, by the processor, whether the resource withdrawal request is a fraudulent withdrawal request based on the second risk identification result;

in response to determining that the resource withdrawal request is not a fraudulent withdrawal request, obtaining, by the processor, the first risk identification results of resource deposits being previously deposited into the target account;

inputting, by the processor, the first risk identification results of the resource deposits being previously deposited into the target account and/or the second risk identification result to the classification and regression tree model;

determining, by the processor, at least one resource transfer risk identification strategy according to the first risk identification results of the resource deposits being previously deposited into the target account and/or the second risk identification result;

generating, by the processor, a determination result of whether the at least one resource transfer risk identification strategy meets a condition;

outputting, by the processor, a resource transaction risk monitoring result of the target account from the classification and regression tree model according to the determination result; and determining, by the processor, whether to process the resource transaction comprising the resource deposit request and/or the resource withdrawal request according to the resource transaction risk monitoring result outputted from the classification and regression tree model.

2. The method according to claim 1, wherein the performing a first risk identification on the target account according to the resource deposit request to obtain a first risk identification result comprises:

acquiring the first association information related to the resource deposit request, wherein the first association information comprises at least one of initiating account information, target account information including terminal activities and/or terminal environment, and first resource transaction information; and performing the first risk identification on the target account according to the first association information using the neural network model to obtain the first risk identification result.

3. The method according to claim 1, wherein the fraudulent deposit request indicates that the resource deposit request has a fraud risk; and wherein the method further comprises, in response to determining that the resource deposit request is a fraudulent deposit request, determining, by the processor, a deposit management and control mode corresponding to at least a threshold of the first risk identification result; and triggering and executing, by the processor, the deposit management and control mode for not fulfilling the resource deposit request.

4. The method according to claim 1, wherein the performing a second risk identification on the target account according to the resource withdrawal request to obtain a second risk identification result comprises:

acquiring the second association information related to the resource withdrawal request, wherein the second association information comprises at least one of target account information, second resource transaction information, or recipient account information; and performing the second risk identification on the target account according to the second association information using the gradient boosting regression model to obtain the second risk identification result.

5. The method according to claim 1, further comprising:

determining that the target account is a fraudulent account in response to that the at least one resource transfer risk identification strategy meets the condition, wherein the fraudulent account indicates that the target account has a fraud risk.

6. The method according to claim 5, further comprising:

in response to determining that the target account is a fraudulent account, determining, by the processor, a disposal management and control mode of the target account according to the at least one resource transfer risk identification strategy that meets the condition; and triggering and executing, by the processor, the disposal management and control mode to manage and control the target account.

7. The method according to claim 1, wherein the second risk identification result comprises second risk identification results of resource withdrawals being previously withdrawn from the target account.

8. An apparatus for monitoring a resource transaction, comprising a processor and a non-transitory computer-readable storage medium storing instructions executable by the processor to cause the apparatus to perform operations comprising:

training a first model with deposit risk training samples consisting of normal deposit transaction samples and fraud deposit transaction samples to obtain a neural network model of resource deposits and to output first risk identification results of the resource deposits from the neural network model, training a second model with withdrawal risk training samples consisting of normal withdrawal transaction samples and disposal transaction samples to obtain a gradient boosting regression model of resource withdrawals and to output second risk identification results of the resource withdrawals from the gradient boosting regression model, and training a third model with samples of the first risk identification results and samples of the second risk identification results to obtain a classification and regression tree model of resource disposals, wherein the deposit risk training samples are different from the withdrawal risk training samples;

receiving a resource deposit request for a resource deposit from a terminal of a resource deposit initiator, and the resource deposit request comprising an identifier of the resource deposit initiator and an identifier of a target account in which a resource is deposited;

performing, using the neural network model, a first risk identification on the target account according to the resource deposit request by at least inputting first association information related to the resource deposit request to the neural network model and outputting a first risk identification result of the resource deposit from the neural network model;

determining whether the resource deposit request is a fraudulent deposit request based on the first risk identification result of the resource deposit request;

in response to determining that the resource deposit request is not a fraudulent deposit request, obtaining first risk identification results of resource deposits being previously deposited into the target account, wherein the neural network model outputs the first risk identification results of the resource deposits being previously deposited into the target account;

receiving a resource withdrawal request for a resource withdrawal from a terminal of a resource withdrawal initiator, the resource withdrawal request comprising an identifier of the resource withdrawal initiator and an identifier of a recipient account, the resource withdrawal request requesting a resource withdrawal from the target account to the recipient account;

performing, using the gradient boosting regression model, a second risk identification on the target account according to the resource withdrawal request by at least inputting second association information related to the resource withdrawal request to the gradient boosting regression model and outputting a second risk identification result of the resource withdrawal from the gradient boosting regression model;

determining whether the resource withdrawal request is a fraudulent withdrawal request based on the second risk identification result;

in response to determining that the resource withdrawal request is not a fraudulent withdrawal request, obtaining the first risk identification results of resource deposits being previously deposited into the target account;

inputting the first risk identification results of the resource deposits being previously deposited into the target account and/or the second risk identification result to the classification and regression tree model;

determining at least one resource transfer risk identification strategy according to the first risk identification results of the resource deposits being previously deposited into the target account and/or the second risk identification result;

generating a determination result of whether the at least one resource transfer risk identification strategy meets a condition;

outputting a resource transaction risk monitoring result of the target account from the classification and regression tree model according to the determination result; and determining whether to process the resource transaction comprising the resource deposit request and/or the resource withdrawal request according to the resource transaction risk monitoring result outputted from the classification and regression tree model.

9. The apparatus according to claim 8, wherein the performing a first risk identification on a target account according to the resource deposit request to obtain a first risk identification result comprises: acquiring the first association information related to the resource deposit request, wherein the first association information comprises at least one of initiating account information, target account information including terminal activities and/or terminal environment, and first resource transaction information; and performing the first risk identification on the target account according to the first association information using the neural network model to obtain the first risk identification result.

10. The apparatus according to claim 8, wherein the fraudulent deposit request indicates that the resource deposit request has a fraud risk; and wherein the operations further comprise, in response to determining that the resource deposit request is a fraudulent deposit request, determining, by the processor, a deposit management and control mode corresponding to at least a threshold of the first risk identification result; and triggering and executing the deposit management and control mode for not fulfilling the resource deposit request.

11. The apparatus according to claim 8, wherein the performing a second risk identification on the target account according to the resource withdrawal request to obtain a second risk identification result comprises:

acquiring the second association information related to the resource withdrawal request, wherein the second association information comprises at least one of target account information, second resource transaction information, or recipient account information; and performing the second risk identification on the target account according to the second association information using the gradient boosting regression model to obtain the second risk identification result.

12. The apparatus according to claim 8, wherein the operations further comprise:

determining that the target account is a fraudulent account in response to that the at least one resource transfer risk identification strategy meets the condition, wherein the fraudulent account indicates that the target account has a fraud risk.

13. The apparatus according to claim 12, the operations further comprise:

in response to determining that the target account is a fraudulent account, determining a disposal management and control mode of the target account according to the at least one resource transfer risk identification strategy that meets the condition; and triggering and executing the disposal management and control mode to manage and control the target account.

14. The apparatus according to claim 8, wherein the second risk identification result comprises second risk identification results of resource withdrawals being previously withdrawn from the target account.

15. A non-transitory computer-readable storage medium for monitoring a resource transaction, configured with instructions executable by one or more processors to cause the one or more processors to perform operations comprising:

training a first model with deposit risk training samples consisting of normal deposit transaction samples and fraud deposit transaction samples to obtain a neural network model of resource deposits and to output first risk identification results of the resource deposits from the neural network mode, training a second model with withdrawal risk training samples consisting of normal withdrawal transaction samples and disposal transaction samples to obtain a gradient boosting regression model of resource withdrawals and to output second risk identification results of the resource withdrawals from the gradient boosting regression model, and training a third model with samples of the first risk identification results and samples of the second risk identification results to obtain a classification and regression tree model of resource disposals, wherein the deposit risk training samples are different from the withdrawal risk training samples;

receiving a resource deposit request for a resource deposit from a terminal of a resource deposit initiator, and the resource deposit request comprising an identifier of the resource deposit initiator and an identifier of a target account in which a resource is deposited;

performing, using the neural network model, a first risk identification on the target account according to the resource deposit request by at least inputting first association information related to the resource deposit request to the neural network model and outputting a first risk identification result of the resource deposit from the neural network model;

determining whether the resource deposit request is a fraudulent deposit request based on the first risk identification result of the resource deposit request;

in response to determining that the resource deposit request is not a fraudulent deposit request, obtaining first risk identification results of resource deposits being previously deposited into the target account, wherein the neural network model outputs the first risk identification results of the resource deposits being previously deposited into the target account;

receiving a resource withdrawal request for a resource withdrawal from a terminal of a resource withdrawal initiator, the resource withdrawal request comprising an identifier of the resource withdrawal initiator and an identifier of a recipient account, the resource withdrawal request requesting a resource withdrawal from the target account to the recipient account;

performing, using the gradient boosting regression model, a second risk identification on the target account according to the resource withdrawal request by at least inputting second association information related to the resource withdrawal request to the gradient boosting regression model and outputting a second risk identification result of the resource withdrawal from the gradient boosting regression model;

determining whether the resource withdrawal request is a fraudulent withdrawal request based on the second risk identification result;

in response to determining that the resource withdrawal request is not a fraudulent withdrawal request, obtaining the first risk identification results of resource deposits being previously deposited into the target account;

inputting the first risk identification results of the resource deposits being previously deposited into the target account and/or the second risk identification result to the classification and regression tree model;

determining at least one resource transfer risk identification strategy according to the first risk identification results of the resource deposits being previously deposited into the target account and/or the second risk identification result;

generating a determination result of whether the at least one resource transfer risk identification strategy meets a condition;

outputting a resource transaction risk monitoring result of the target account from the classification and regression tree model according to the determination result; and determining whether to process the resource transaction comprising the resource deposit request and/or the resource withdrawal request according to the resource transaction risk monitoring result outputted from the classification and regression tree model.

16. The storage medium according to claim 15, wherein the performing a first risk identification on a target account according to the resource deposit request to obtain a first risk identification result comprises:

acquiring the first association information related to the resource deposit request, wherein the first association information comprises at least one of initiating account information, target account information including terminal activities and/or terminal environment, and first resource transaction information; and performing the first risk identification on the target account according to the first association information using the neural network model to obtain the first risk identification result.

17. The storage medium according to claim 15, wherein the fraudulent deposit request indicates that the resource deposit request has a fraud risk; and wherein the operations further comprise, in response to determining that the resource deposit request is a fraudulent deposit request, determining, by the processor, a deposit management and control mode corresponding to at least a threshold of the first risk identification result; and triggering and executing the deposit management and control mode for not fulfilling the resource deposit request.

18. The storage medium according to claim 15, wherein the performing a second risk identification on the target account according to the resource withdrawal request to obtain a second risk identification result comprises:

acquiring the second association information related to the resource withdrawal request, wherein the second association information comprises at least one of target account information, second resource transaction information, or recipient account information; and performing the second risk identification on the target account according to the second association information using the gradient boosting regression model to obtain the second risk identification result.

19. The storage medium according to claim 15, wherein the operations further comprise:

determining that the target account is a fraudulent account in response to that the at least one resource transfer risk identification strategy meets the condition, wherein the fraudulent account indicates that the target account has a fraud risk.

20. The storage medium according to claim 19, the operations further comprise:

in response to determining that the target account is a fraudulent account, determining a disposal management and control mode of the target account according to the at least one resource transfer risk identification strategy that meets the condition; and triggering and executing the disposal management and control mode to manage and control the target account.

* * * * *